US011377907B2

(12) United States Patent
Cantwell et al.

(10) Patent No.: US 11,377,907 B2
(45) Date of Patent: Jul. 5, 2022

(54) ANIMAL CRATE

(71) Applicant: MID-WEST METAL PRODUCTS CO., INC., Muncie, IN (US)

(72) Inventors: Brad Cantwell, Muncie, IN (US); Michael E. Greene, Muncie, IN (US); Stew Kerr, Muncie, IN (US); David J. Nolley, Muncie, IN (US)

(73) Assignee: Mid-West Metal Products Company, Inc., Muncie, IN (US)

( * ) Notice: Subject to any disclaimer, the term of this patent is extended or adjusted under 35 U.S.C. 154(b) by 206 days.

(21) Appl. No.: 16/679,571

(22) Filed: Nov. 11, 2019

(65) Prior Publication Data

US 2020/0068842 A1 Mar. 5, 2020

Related U.S. Application Data

(60) Division of application No. 15/432,100, filed on Feb. 14, 2017, now Pat. No. 10,470,432, which is a
(Continued)

(51) Int. Cl.
*A01K 1/03* (2006.01)
*E06B 11/02* (2006.01)
(Continued)

(52) U.S. Cl.
CPC .......... *E06B 11/026* (2013.01); *A01K 1/0017* (2013.01); *A01K 1/03* (2013.01);
(Continued)

(58) Field of Classification Search
CPC ........ A01K 1/0017; A01K 1/03; A01K 1/033; A01K 1/032; A01K 31/08; A01K 1/0035; A01K 1/031; A01K 1/034; A01K 31/07; A01K 31/06; A01K 1/02; A01K 1/0236; A01K 1/0245; A01K 31/10; E06B 11/021; E06B 11/026; E06B 11/045; E06B 11/02; E06B 3/4636; E05C 1/04; E05C 1/006; E05C 1/08
See application file for complete search history.

(56) References Cited

U.S. PATENT DOCUMENTS 2,892,562 A 6/1959 Smithson
4,763,606 A 8/1988 Ondrasik
(Continued)

*Primary Examiner* — Trinh T Nguyen
(74) *Attorney, Agent, or Firm* — Taft Stettinius & Hollister LLP; Stephen F. Rost

(57) ABSTRACT

A door assembly for an animal enclosure includes a door frame and a door each having a plurality of interconnected horizontal and vertical wires. The door frame defines an opening for an animal to pass therethrough, and the door is slidably coupled to the door frame such that it moves between an open position and a closed position relative to the door frame to allow egress and ingress through the opening. A catch member is coupled to the door frame. A latch includes a base member, a bolt, and a lever portion. A first vertical wire and a second vertical wire of the door are spaced from one another such that the first vertical wire is at a first end of the door and the second vertical wire is at a second end of the door. In the closed position, the bolt is coupled to the first vertical wire.

20 Claims, 17 Drawing Sheets

Related U.S. Application Data continuation-in-part of application No. 15/069,002, filed on Mar. 14, 2016, now Pat. No. 9,708,853, which is a continuation of application No. 14/161,950, filed on Jan. 23, 2014, now Pat. No. 9,399,889.

(60) Provisional application No. 61/758,400, filed on Jan. 30, 2013, provisional application No. 61/879,716, filed on Sep. 19, 2013.

(51) Int. Cl.
*A01K 31/08* (2006.01)
*E05C 1/00* (2006.01)
*E05C 1/04* (2006.01)
*A01K 1/00* (2006.01)

(52) U.S. Cl.
CPC .............. *A01K 1/032* (2013.01); *A01K 1/033* (2013.01); *A01K 31/08* (2013.01); *E05C 1/006* (2013.01); *E05C 1/04* (2013.01); *E06B 11/021* (2013.01)

(56) References Cited

U.S. PATENT DOCUMENTS

| | | | |
|---|---|---|---|
| 5,626,098 A | 5/1997 | Askins | |
| 2012/0186529 A1* | 7/2012 | Cantwell | A01K 1/03 119/474 |
| 2012/0227328 A1* | 9/2012 | Link | E06B 3/34 49/394 |
| 2014/0216354 A1* | 8/2014 | Cantwell | E04H 17/02 119/481 |
| 2015/0305297 A1* | 10/2015 | Link | A01K 1/034 119/474 |
| 2016/0014996 A1* | 1/2016 | Link | A01K 1/034 119/481 |
| 2016/0024824 A1* | 1/2016 | Link | A01K 1/03 119/481 |
| 2016/0348401 A1* | 12/2016 | Veness | A01K 1/0035 |
| 2017/0292299 A1* | 10/2017 | Cantwell | A01K 1/0064 |
| 2019/0063122 A1* | 2/2019 | McDaid | A01K 1/0064 |

* cited by examiner

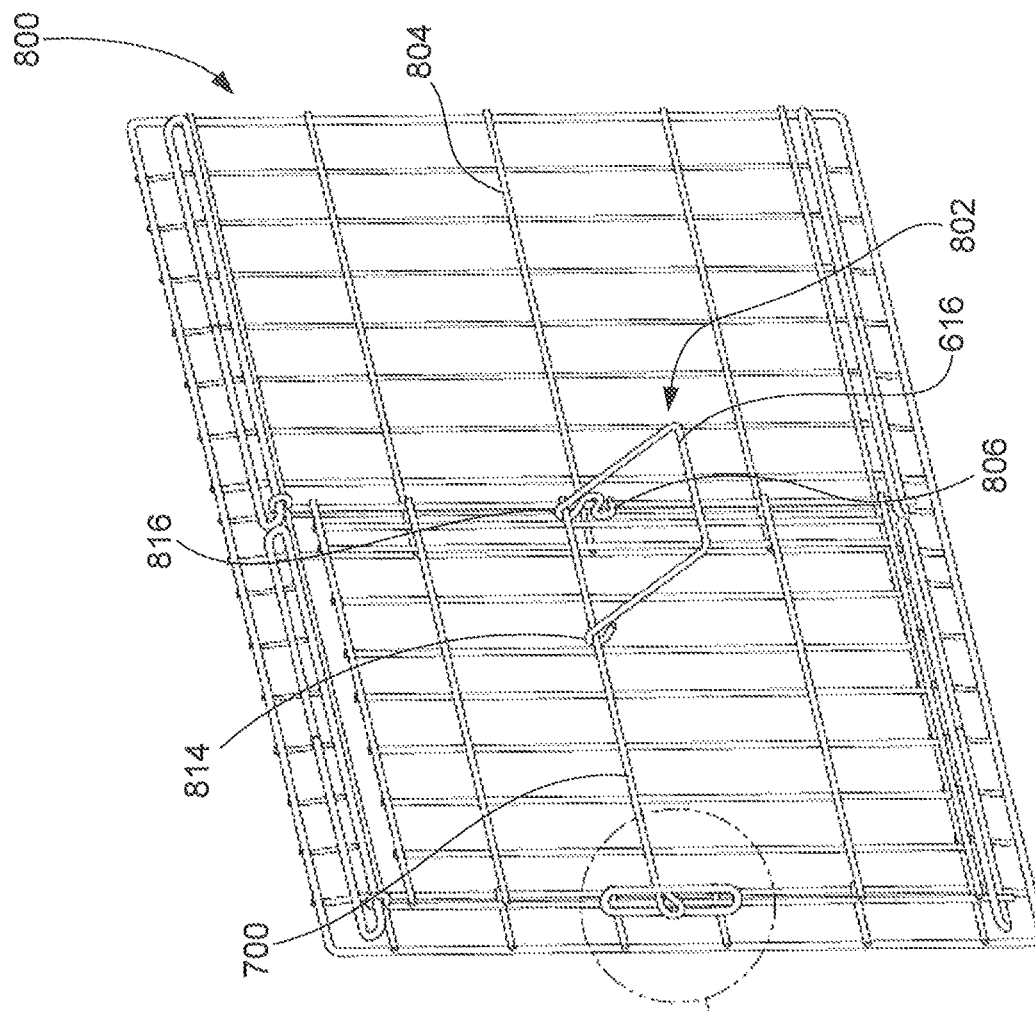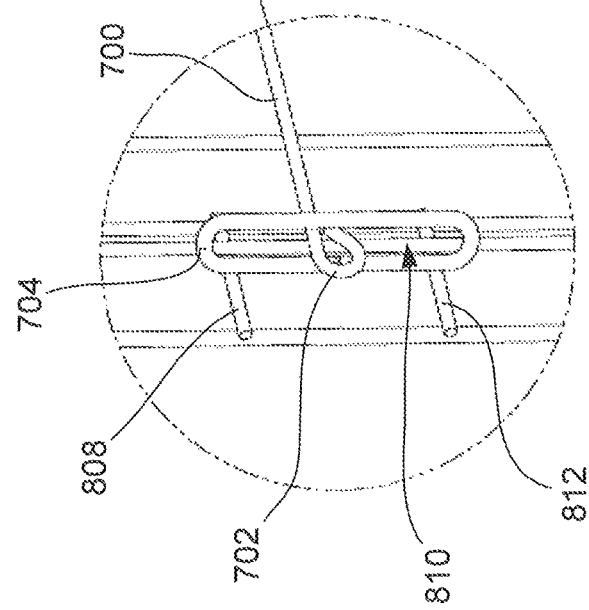
Fig. 8
Fig. 8A

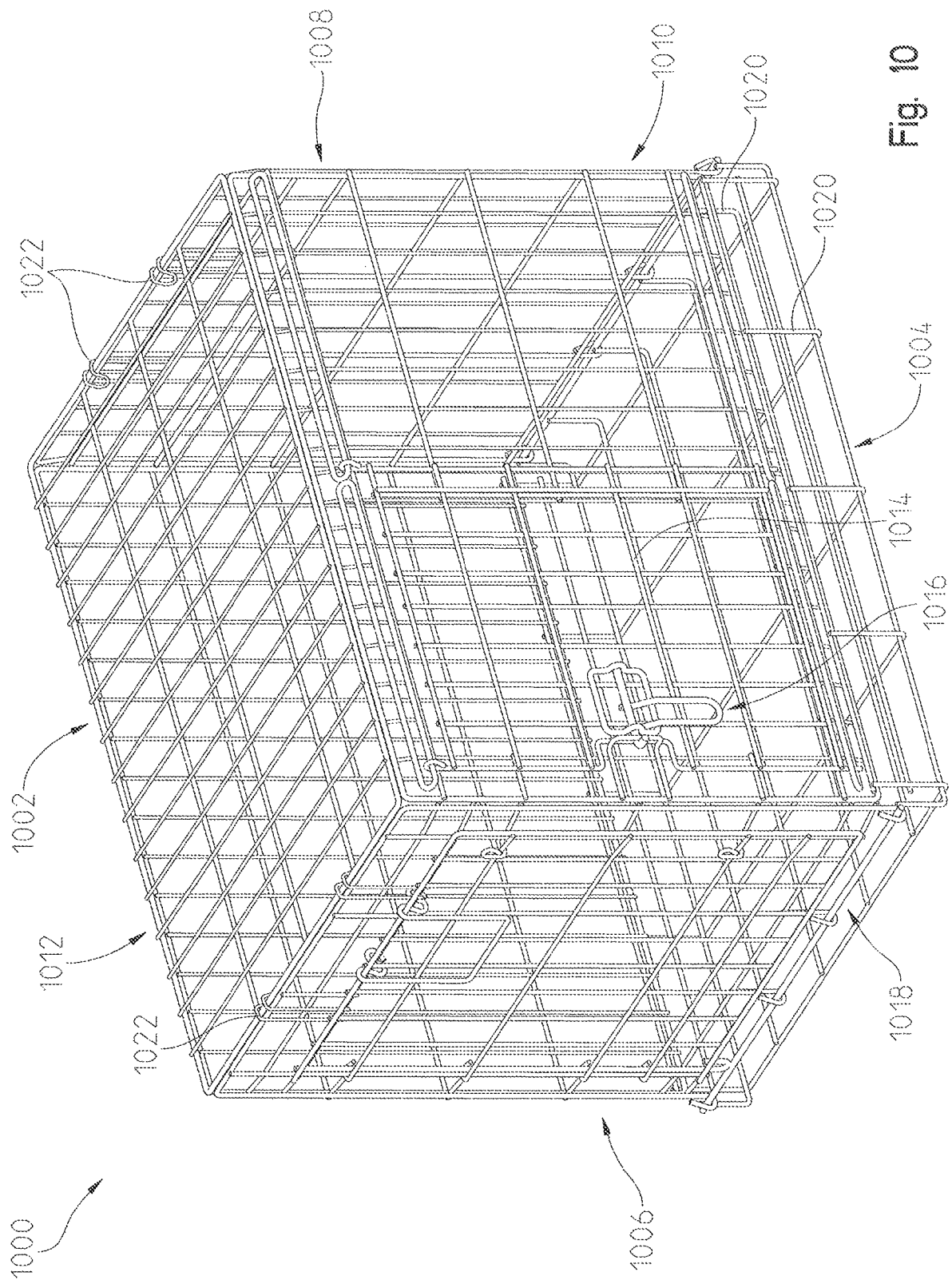

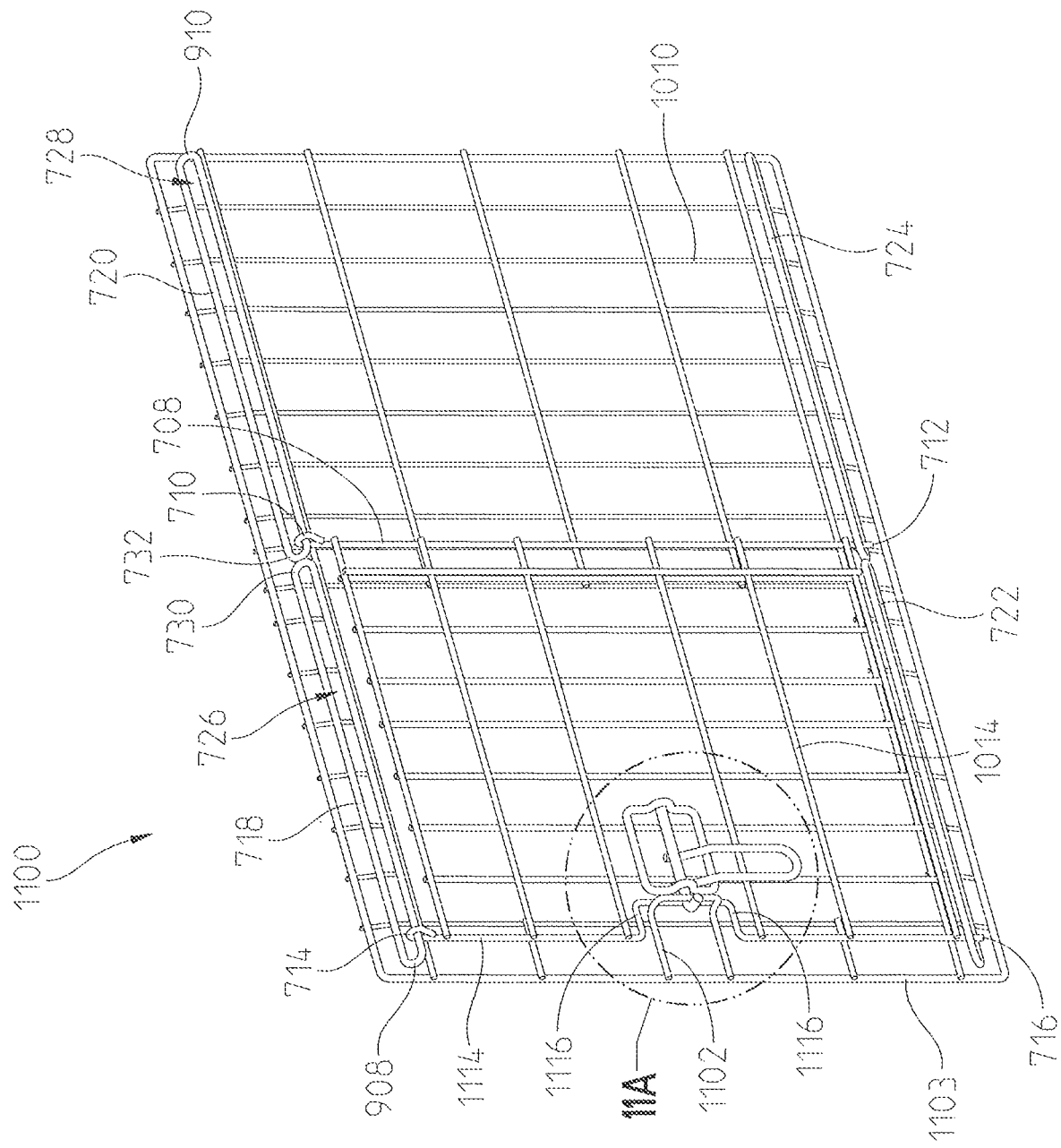

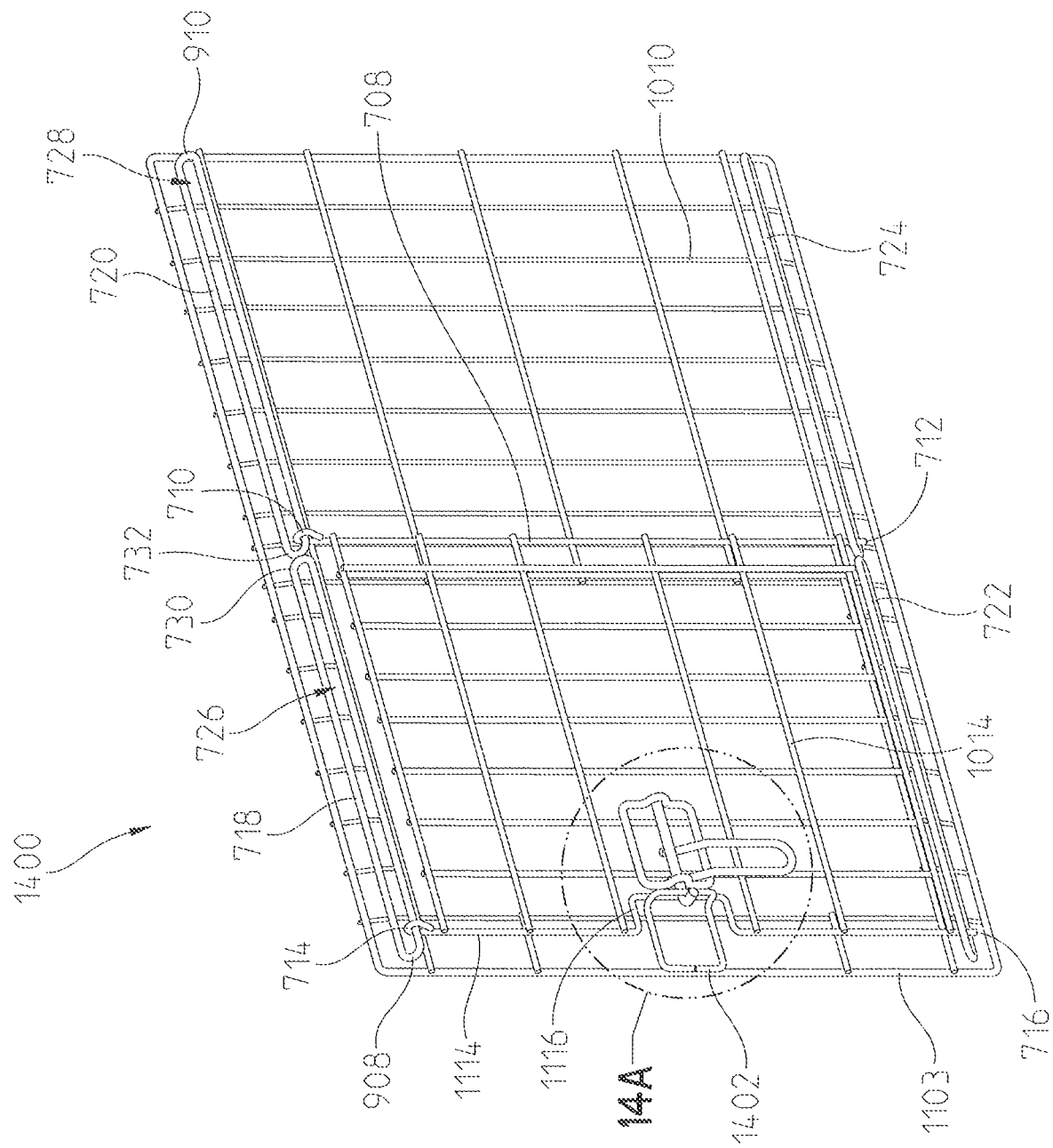

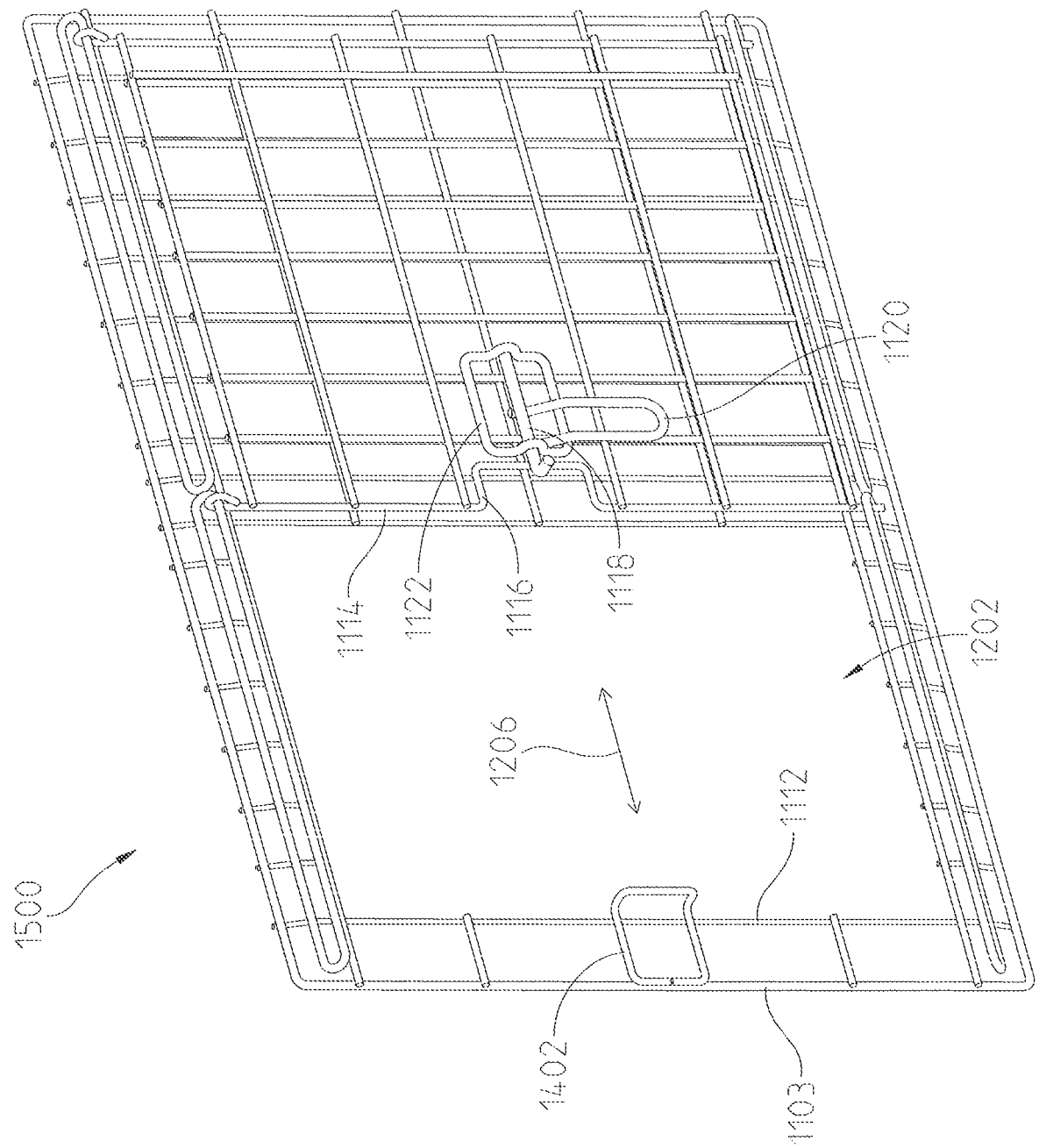

ANIMAL CRATE

RELATED APPLICATIONS

This application is a division of U.S. patent application Ser. No. 15/432,100, filed Feb. 14, 2017, which is a continuation-in-part application of U.S. patent application Ser. No. 15/069,002, filed Mar. 14, 2016, which is a continuation application of U.S. patent application Ser. No. 14/161,950, filed Jan. 23, 2014, which claims priority to U.S. Provisional Patent Application Ser. No. 61/758,400, filed on Jan. 30, 2013, and U.S. Provisional Patent Application Ser. No. 61/879,716, filed on Sep. 19, 2013, the disclosures of which are hereby incorporated by reference in their entirety.

FIELD OF THE DISCLOSURE

The present disclosure relates to an apparatus for containing animals, and in particular to a collapsible wire crate for containing animals.

BACKGROUND

The use of animal cages is well known in the prior art. Many conventional cages have been developed over the years for housing animals of different sizes, and through the development of these cages flexibility and portability have become points of emphasis. Some conventional cages, for example, have been designed to collapse to a compact position for portability. Others have been designed of light weight and from durable materials. Conventional cages have been designed for ease of transporting an animal.

Most conventional cages include at least one door for providing access to the interior of the cage. An animal can enter or exit the cage through the opening when the door is opened, and the animal can be safely contained in the cage when the door is closed. Many conventional cages include a door that is attached to the cage via a hinge. This allows the door to be swung open and closed. A spring activated latch or the like have been incorporated into the design of the door to allow a user to open or securely lock the door.

Many of these conventional designs have limitations, however. For instance, the door that is hingedly attached to the cage can be swung open or closed too quickly and scratch or damage another object such as a wall or furniture. Hinged doors also require placement in a location with enough space to allow the door to swing open. This limits where the cage may be placed or stored. In addition, due to the hinged connection, the door may not be able to remain partially opened, i.e., the door is either in an open position or closed position.

Therefore, a need exists for an improved animal crate that can be collapsible, portable, and overcomes some of the above-mentioned limitations in the prior art.

SUMMARY

In a first embodiment of the present disclosure, a door assembly for an animal enclosure is provided. The door assembly includes a door frame having a plurality of interconnected horizontal and vertical wires that define an opening for an animal to pass therethrough and enter or exit the interior of the enclosure; a door configured to move between an open position and a closed position relative to the door frame, the door having a plurality of interconnected horizontal and vertical wires and being slidably coupled to the door frame to allow egress and ingress through the opening; a latch pivotably coupled to the door, wherein the latch includes a latching mechanism removably coupled to one of the plurality of horizontal wires of the door frame; a first vertical wire and a second vertical wire of the door, the first vertical wire and the second vertical wire being spaced from one another such that the first vertical wire is at a first end of the door and the second vertical wire is at a second end of the door; and a first guide wire and a second guide wire coupled to the door frame; wherein, the first vertical wire is coupled to and moves along the first guide wire between the open and closed positions, and the second vertical wire is coupled to and moves along the second guide wire between the open and closed positions.

In one example, the door assembly includes a catch member coupled to the frame, the catch member configured to engage the door in the closed position. In a second example, a first wire of the plurality of horizontal wires of the door has a first end and a second end, the first end being removably engaged to the catch member in the closed position. In a third example, the latch is pivotably coupled about the first wire of the door. In a fourth example, the door frame comprises a first support wire and a second support wire, the first support wire being vertically spaced from the second support wire; and the catch member being coupled to the first support wire and the second support wire.

In a fifth example, the latch is formed by a single wire having a first end and a second end, the first end forming a curled end and pivotably coupled to a horizontal wire of the door and the second end being bent and pivotably coupled to the horizontal wire; and the latching mechanism is formed by a bend in the second end of the single wire; further wherein, the latching mechanism is releasably coupleable to any location along the length of the one of the plurality of horizontal wires of the door frame to position the door in the open position, the closed position, and any position therebetween. In a sixth example, the first guide wire and the second guide wire are bent to form guide openings. In a seventh example, the size of each guide opening is substantially the same and each defines the length or distance of travel of the door.

In a seventh example, the first vertical wire comprises a curled first end coupled to the first guide wire and a substantially straight second end; and the second vertical wire comprises a curled first end coupled to the second guide wire and a substantially straight second end. In an eighth example, the door assembly includes a third guide wire coupled to the door frame; and a fourth guide wire coupled to the door frame; wherein, the substantially straight second end of the first vertical wire is coupled to and moves along the third guide wire, and the substantially straight second end of second vertical wire is coupled to and moves along the fourth guide wire. In a ninth example, the first guide wire and the second guide wire are coupled near the top of the door frame, and the third guide wire and the fourth guide wire are coupled near the bottom of the door frame. In a tenth example, the third guide wire and the fourth guide wire are bent to form guide openings through which the first and second vertical wires, respectively, move through between the open and closed positions.

In another embodiment of this disclosure, an animal crate includes a door frame having a plurality of interconnected horizontal and vertical wires that define an opening for an animal to pass therethrough and enter or exit the interior of the animal crate; a door configured to move laterally between an open position and a closed position relative to the door frame, the door having a plurality of interconnected horizontal and vertical wires; and at least two mechanisms releasably coupling the door to the door frame in the closed position, where one of the two mechanisms is pivotably coupled to the door and the second of the two mechanisms is affixed to the door frame; wherein, the first of the two mechanisms is releasably coupleable to any location along a length of one of the plurality of horizontal wires of the door frame such that the door is disposable relative to the door frame in the open position, the closed position, or any position therebetween.

In one example, the first of the two mechanisms comprises a latch pivotably coupled to the door, wherein the latch is pivotable between a first position in which the latch is engaged with the one horizontal wire of the door frame and a second position in which the latch is disengaged from the one horizontal wire of the door frame. In a second example, the second of the two mechanisms comprises a catch member coupled to the frame, the catch member configured to engage the door only in the closed position. In a third example, the animal crate includes a first vertical wire and a second vertical wire of the door, the first vertical wire and the second vertical wire being spaced from one another such that the first vertical wire is at a first end of the door and the second vertical wire is at a second end of the door; and a first guide wire and a second guide wire coupled to the door frame; wherein, the first vertical wire is coupled to and moves along the first guide wire between the open and closed positions, and the second vertical wire is coupled to and moves along the second guide wire between the open and closed positions. In a fourth example, the animal crate includes a first wire of the plurality of horizontal wires of the door having a first end and a second end, the first end being elastically bent outwards away from interior of the animal crate; wherein, the first end engages the second of the two mechanisms in the closed position and maintains the door in the closed position until the first end is disengaged from the second of the two mechanisms.

In a different embodiment, an animal enclosure includes a top member, a bottom member, and a plurality of side members, wherein the top member, bottom member, and the plurality of side members define an interior of the enclosure; a door frame defined by at least one of the side members, the door frame having a plurality of interconnected horizontal and vertical wires that define an opening for an animal to pass therethrough and enter or exit the interior of the enclosure; a door formed by a plurality of interconnected horizontal and vertical wires, the door being movable laterally between an open position and a closed position relative to the door frame, wherein the opening is accessible in the open position and inaccessible in the closed position; a first vertical wire and a second vertical wire of the plurality of vertical wires of the door, the first vertical wire and the second vertical wire being spaced from one another such that the first vertical wire is at a first end of the door and the second vertical wire is at a second end of the door; a first guide wire and a second guide wire coupled near a top end of the door frame and a third guide wire and a fourth guide wire coupled near a bottom end of the door frame; and a plurality of mechanisms releasably coupling the door to the door frame in the closed position, where one of the plurality of mechanisms is pivotably coupled to the door and a second of the plurality of mechanisms is affixed to the door frame; wherein, a first end of the first vertical wire is coupled to and moves along the first guide wire between the open and closed positions, and a second end of the first vertical wire is in contact with the third guide wire in the open and closed positions; further wherein, a first end of the second vertical wire is coupled to and moves along the second guide wire between the open and closed positions, and a second end of the second vertical wire is in contact with the fourth guide wire in the open and closed positions.

In one example, the one of the plurality of mechanisms comprises a latch pivotably coupled to the door, the latch including a latching mechanism that is releasably coupleable to one of the plurality of horizontal wires of the door frame in the closed position; wherein, the latching mechanism is releasably coupleable to the one horizontal wire of the door frame at any location along its length such that the door is disposable relative to the door frame in the open position, the closed position, or any position therebetween. In a second example, the second of the plurality of mechanisms comprises a catch member coupled to the frame, the catch member defining an opening for receiving an end of one of the plurality of horizontal wires of the door in the closed position.

In a further embodiment of the present disclosure, a door assembly for an animal enclosure includes a door frame having a plurality of interconnected horizontal and vertical wires that define an opening for an animal to pass therethrough and enter or exit the interior of the enclosure; a door configured to move between an open position and a closed position relative to the door frame, the door having a plurality of interconnected horizontal and vertical wires and being slidably coupled to the door frame to allow egress and ingress through the opening; a catch member coupled to the door frame, the catch member formed by a substantially U-shaped wire; a latch comprising a base member, a bolt, and a lever portion, where the bolt is slidably coupled to the base member; a first vertical wire and a second vertical wire of the door, the first vertical wire and the second vertical wire being spaced from one another such that the first vertical wire is at a first end of the door and the second vertical wire is at a second end of the door; and a first guide wire and a second guide wire coupled to the door frame; wherein, the first vertical wire is coupled to and moves along the first guide wire between the open and closed positions, and the second vertical wire is coupled to and moves along the second guide wire between the open and closed positions; further wherein, in the closed position, the bolt is coupled to the first vertical wire.

In one example of this embodiment, the bolt includes a single wire forming a substantially straight portion and a bent portion, the bent portion coupling to the first vertical wire in the closed position. In a second example, the bolt is rotatably disposed within at least one bolt opening defined by the base member. In a third example, the bolt is rotatably between a latched position and an unlatch position, the bolt being coupled to the first vertical wire in the latched position; and the bent portion is oriented in a direction away from the door opening in the latched position, and oriented in an upward direction in the unlatched position. In a fourth example, the catch member includes a first end and a second end, the first end and second end spaced from one another and coupled to an outer vertical wire of the door frame.

In a fifth example, the catch member is coupled to another vertical wire of the door frame at locations which are spaced horizontally from the first and second ends. In a sixth example, the catch member is partially disposed within a first plane and a second plane, the first plane and second plane being substantially perpendicular to one another. In a seventh example, the first vertical wire includes a substantially U-shaped bend between its two ends, the substantially U-shaped bend forming a recessed area in which the catch member is received in the closed position. In a further example of this embodiment, the door assembly may include a third guide wire coupled to the door frame; and a fourth guide wire coupled to the door frame; wherein, the first vertical wire is coupled to and moves along the third guide wire, and the second vertical wire is coupled to and moves along the fourth guide wire.

In yet a further embodiment of the present disclosure, a door assembly for an animal enclosure includes a door frame having a plurality of interconnected horizontal and vertical wires that define an opening for an animal to pass therethrough and enter or exit the interior of the enclosure; a door configured to move between an open position and a closed position relative to the door frame, the door having a plurality of interconnected horizontal and vertical wires and being slidably coupled to the door frame to allow egress and ingress through the opening; a catch member coupled to the door frame, the catch member having a first end and a second end; a latch comprising a base member, a bolt, and a lever portion, where the bolt is slidably coupled to the base member; a first vertical wire and a second vertical wire of the door, the first vertical wire and the second vertical wire being spaced from one another such that the first vertical wire is at a first end of the door and the second vertical wire is at a second end of the door; and a first guide wire and a second guide wire coupled to the door frame; wherein, the first vertical wire is coupled to and moves along the first guide wire between the open and closed positions, and the second vertical wire is coupled to and moves along the second guide wire between the open and closed positions; further wherein, in the closed position, the bolt is coupled to the first vertical wire.

In one example of this embodiment, the first end and second end of the catch member are spaced from one another and coupled to an outer vertical wire of the door frame. In a second example, the first end and second of the catch member are integrally coupled to one another such that the catch member is formed by a single, continuous wire. In a third example, the catch member includes a substantially closed loop design. In a fourth example, the catch member is coupled to another vertical wire of the door frame at locations which are spaced horizontally from the first and second ends. In a fifth example, the bolt includes a single wire forming a substantially straight portion and a bent portion, the bent portion coupling to the first vertical wire in the closed position; and the bolt is rotatably disposed within at least one bolt opening defined by the base member.

In a sixth example, the bolt is rotatably between a latched position and an unlatch position, the bolt being coupled to the first vertical wire in the latched position; and the bent portion is oriented in a direction away from the door opening in the latched position, and oriented in an upward direction in the unlatched position. In a seventh example, the catch member is partially disposed within a first plane and a second plane, the first plane and second plane being substantially perpendicular to one another. In an eighth example, the first vertical wire comprises a substantially U-shaped bend between its two ends, the substantially U-shaped bend forming a recessed area in which the catch member is received in the closed position. In another example, the door assembly includes a third guide wire coupled to the door frame; and a fourth guide wire coupled to the door frame; wherein, the first vertical wire is coupled to and moves along the third guide wire, and the second vertical wire is coupled to and moves along the fourth guide wire.

In yet another embodiment of the present disclosure, an animal crate includes a plurality of members including a top member, a bottom member, and a side member, wherein the top member, bottom member and the side member are coupled to one another to define an interior, where each member is formed by a plurality of interconnected horizontal and vertical wires; a door frame formed in the side member and include a plurality of interconnected horizontal and vertical wires that define an opening for an animal to pass therethrough and enter or exit the interior of the enclosure; a door configured to move between an open position and a closed position relative to the door frame, the door having a plurality of interconnected horizontal and vertical wires and being slidably coupled to the door frame to allow egress and ingress through the opening; a catch member coupled to the door frame, the catch member having a first end and a second end; a latch comprising a base member, a bolt, and a lever portion, where the bolt is slidably coupled to the base member; a first vertical wire and a second vertical wire of the door, the first vertical wire and the second vertical wire being spaced from one another such that the first vertical wire is at a first end of the door and the second vertical wire is at a second end of the door; and a first guide wire and a second guide wire coupled to the door frame; wherein, the first vertical wire is coupled to and moves along the first guide wire between the open and closed positions, and the second vertical wire is coupled to and moves along the second guide wire between the open and closed positions; further wherein, in the closed position, the bolt is coupled to the first vertical wire.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3A is an enlarged perspective view of a latch assembly of the wire crate of FIG. 1 disposed in a latched position;

FIG. 4A is an enlarged perspective view of the latch system of FIG. 3A in a partially unlatched position;

FIG. 8 is a perspective view of a door frame and door of FIG. 7 in a closed position;

FIG. 8A is a partial enlarged perspective view of the door frame and door of FIG. 7;

FIG. 10 is a perspective view of a different wire crate;

FIG. 11 is a perspective view of a door frame and door of the wire crate of FIG. 10;

FIG. 14 is a perspective view of a door frame and door of the wire crate of FIG. 13;

FIG. 15 is a perspective view of the door frame and door of FIG. 13 in an open position.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The present disclosure relates to a collapsible wire crate. The wire crate can be used for multiple purposes, such as to contain an animal or for storing an object. The crate can be made of any size for accommodating an object of any size. In addition, the crate can be made of different materials including aluminum, plastic, and steel.

Figure 1:
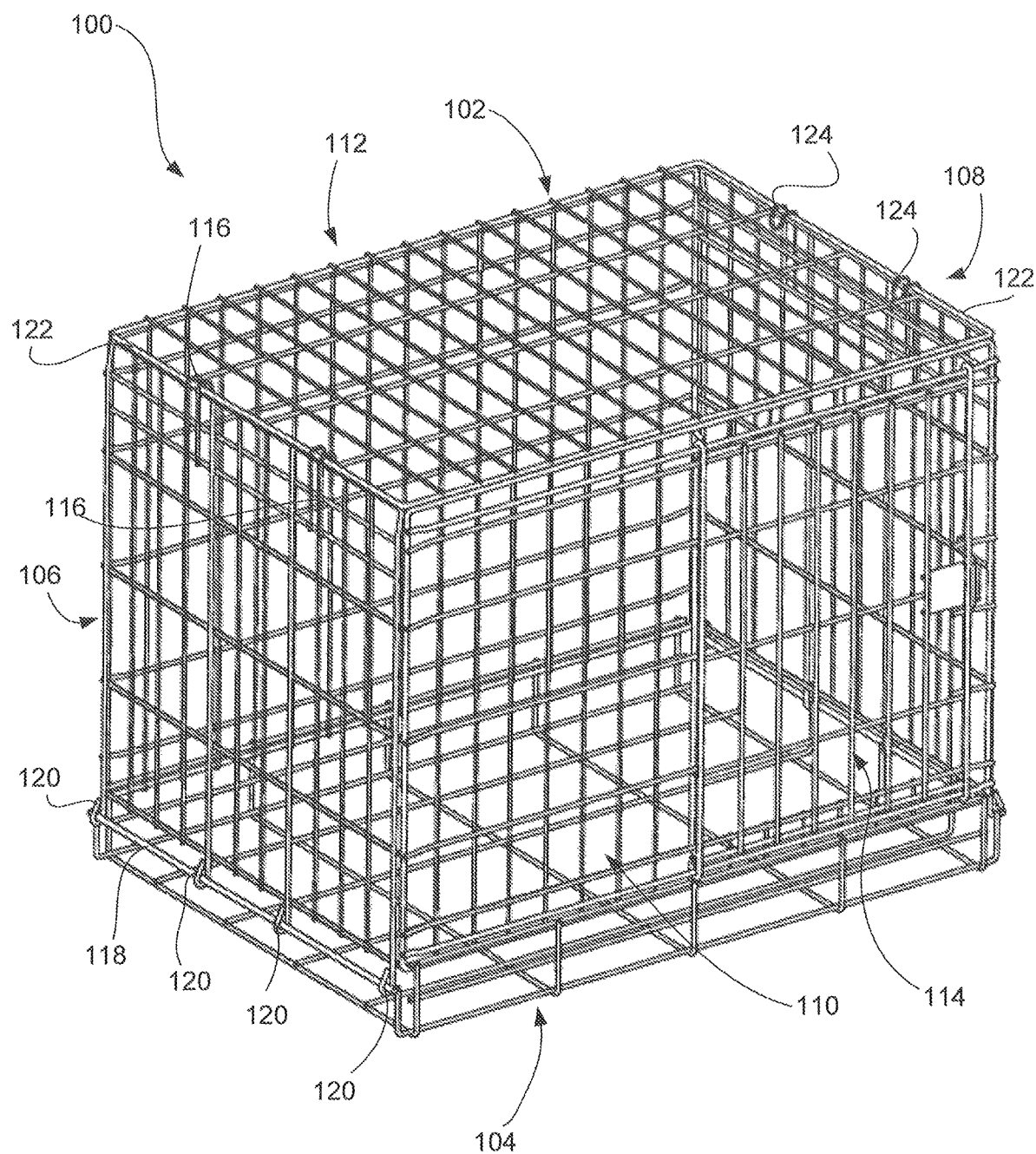
FIG. 1 is a perspective view of a wire crate.

Referring to FIG. 1, an exemplary embodiment of a crate 100 is shown. The crate 100 can be formed of substantially horizontal and vertical wires that overlap one another to define an interior portion. One or more of the horizontal wires can be coupled to one or more of the vertical wires, and vice versa, to add structural integrity to the crate 100. For instance, the wires may be welded, adhered, fastened, or coupled to one another through a variety of means. The crate 100 can include a top member 102, a bottom member 104, a front member 106, and a back member 108. The crate 100 can further include a first side member 110 and a second side member 112, where the first side member 110 is oppositely disposed from the second side member 112. The dimensions of each member can vary to accommodate the size of any animal, for example. In an upright, fully assembled orientation or position, the top member 102, bottom member 104, front member 106, back member 108, first side member 110, and second side member 112 can define an interior of the crate 100 which is sized to receive and accommodate an animal or other object, as desired.

In one aspect, the front member 106, back member 108, top member 102, and bottom member 104 can form a continuous structure. In other words, these members can be fixedly attached to one another. Alternatively, the top member 102, bottom member 104, first side member 110, and second side member 112 can form a continuous structure such that the top member 102 and bottom member 104 are affixed to the first side member 110 and second side member 112. In a different aspect, each member may be removably coupled to one another such that the different members are removably coupled to one another.

Each of the top member 102, bottom member 104, front member 106, back member 108, first side member 110, and second side member 112 can be formed by a plurality of overlapping horizontal and vertical wires or rods. The number of horizontal and vertical wires as well as the spacing therebetween can vary. If a smaller animal is being contained in the crate 100, the spacing may be desirably smaller than if a larger animal is being contained.

In FIG. 1, the first side member 110 of the crate 100 can define a door frame which includes corresponding structure for accommodating a door 114. The door 114 can also be made of substantially overlapping horizontal and vertical wires as shown in FIG. 1. Further, the door 114 can be movably disposed between an open position and a closed position. In the open position, i.e., in FIG. 2, the first side member 110 defines an opening 204 (FIG. 2) that provides access to the interior of the crate 100.

Figures 2, 2A:
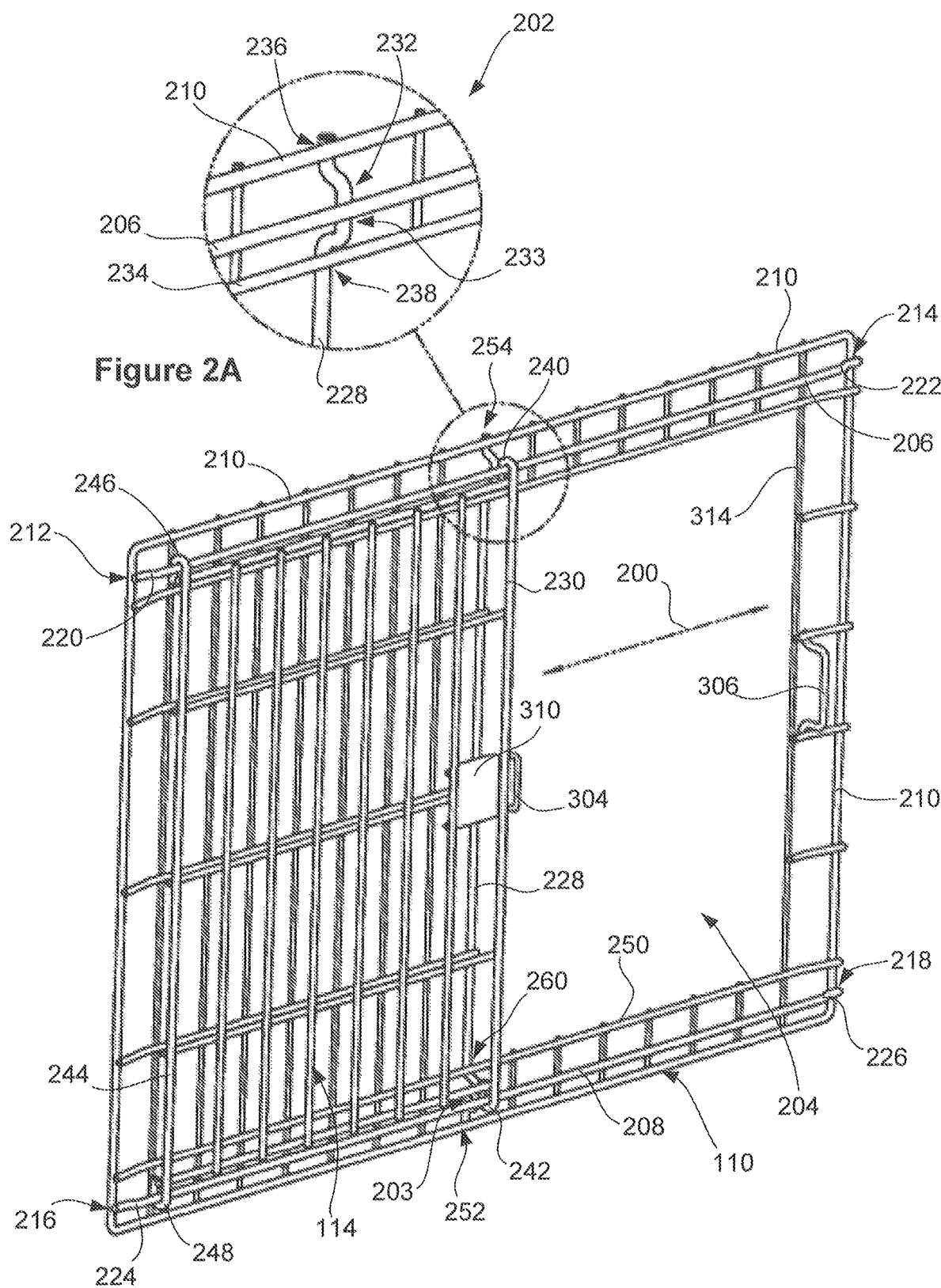
FIG. 2 is a perspective view of a door frame and door of the wire crate of FIG. 1.
FIG. 2A is an enlarged perspective view of a first door stop mechanism of the door frame of FIG. 2.

As shown in FIGS. 1 and 2, the door 114 can move between the closed position (FIG. 1) and the open position (FIG. 2) by moving the door 114 in a lateral direction identified by arrow 200 in FIG. 2. In this manner, the door 114 is disposed in a plane, and as the door moves between the open and closed positions, the door 114 remains in the plane. The door 114 can move relative to the first side member 110 along a first horizontal wire 206 and a second horizontal wire 208. The first horizontal wire 206 and the second horizontal wire 208 can also be referred to as guide wires. In FIG. 2, the first horizontal wire 206 is disposed near the top edge of the first side member 110 and the second horizontal wire 208 is disposed near the bottom edge of the first side member 110.

The first horizontal wire 206 and second horizontal wire 208 may be offset in a direction opposite the interior of the crate from the first side member 110 by a distance sufficient to allow the door 114 to be slidably coupled to the first horizontal wire 206 and second horizontal wire 208. Stated another way, the first side member 110 can include an outer frame wire 210 that is continuous about the four edges of the first side member 110. The outer frame wire 210 can be defined in a first plane. The first horizontal wire 206 and second horizontal wire 208 can be at least partially disposed offset from the first plane such that both wires are disposed in a second plane, where the second plane is substantially parallel to the first plane. The spacing between the first plane and second plane can allow the door 114 to move along the first horizontal wire 206 and second horizontal wire 208 without contacting or being interfered by the other horizontal and vertical wires of the first side member 110 while being sufficiently close to side member 110 to restrict access into or out of the interior of crate 100 when the door 114 is in the closed position.

Referring to FIG. 2, while the first horizontal wire 206 and second horizontal wire 208 are offset or spaced from the outer frame wire 210, both wires can be coupled at each respective end to the outer frame wire 210. For instance, the first horizontal wire 206 can be coupled at one end 212 and at an opposite end 214 to the outer frame wire 210. Similarly, the second horizontal wire can be coupled at one end 216 and at an opposite end 218 thereof to the outer frame wire 210. The wires can be coupled to the outer frame wire 210 by means of welding, adhesive, a fastener or coupler, press-fit (e.g., the horizontal wire can wrap around the outer frame wire 210 to form a press-fitting), or any other known means.

To offset both horizontal wires from the outer frame wire, the first horizontal wire 206 can include a first transverse bend 220 defined in the wire 206 near its first end 212 and a second transverse bend 222 near its second end 214. The bends at each end of the first horizontal wire 206 allows a substantial portion of the length of the wire 206 to be offset from the first plane defined by the outer frame wire 210 while remaining close enough to side panel 110 to restrict access into or out of the crate 100 when door 114 is in the closed position. This, in effect, allows the door 114 to move about this substantial portion of the first horizontal wire 206 in a smooth manner. Likewise, the second horizontal wire 208 can include a first transverse bend 224 disposed near its first end 216 and a second transverse bend 226 disposed near its second end 218.

In the illustrated embodiments, the door 114 does not include any means for sliding or moving about the first horizontal wire 206 and second horizontal wire 208, (e.g., casters or wheels), but in other embodiments a mechanism to facilitate the movement along the wires (e.g., casters) may be included to assist with opening and closing the door 114. In the present embodiment, the material used for each wire, and in particular the wires that move relative to one another, can include properties that allow for a smooth opening and closing of the door 114. Alternatively, a supplemental material may be disposed along the horizontal wires 206, 208 to further accommodate movement of the door 114 relative thereto.

The first side member 110 may also include a first door stop mechanism 202 and a second door stop mechanism 203, as shown in FIG. 2. The first and second door stop mechanisms 202, 203 can be partially formed by a vertical wire 228 that is coupled to outer frame wire 210 near a top portion 254 and bottom portion 252, respectively, of the first side member 110. In FIG. 2A, the vertical wire 228 can be coupled to the outer frame wire 210 at a first location 236 and to a different horizontal wire 234 of the first side member 110 at a second location 238. Each of the first location 236 and second location 238 are locations along the length of the vertical wire 228 and each is spaced from the other by a defined distance. Between the first location 236 and the second location 238, the vertical wire 228 includes a protruding portion 232 that can function as a door stop member. The protruding portion 232 can include a substantially U-shaped structure that protrudes by at least a distance in which the wire 228 at least partially passes through the second plane created by the offset portions of the horizontal wires 206, 208.

Similarly, the second door stop mechanism 203 can also be formed by the vertical wire 228 that is coupled to outer frame wire 210 near the bottom of the first side member 110. The vertical wire 228 can be coupled to the outer frame wire 210 at a first location 252 and to a horizontal wire 250 of the first side member 110 at a second location 260. Each of the first location 252 and second location 260 are locations along the length of the vertical wire 228 and each is spaced from the other by a defined distance. Between the first location 252 and the second location 260, the vertical wire 228 includes a protruding portion that can function as a door stop member. The protruding portion can include a substantially U-shaped structure that protrudes by at least a distance in which the wire 228 at least partially passes through the first plane and the second plane created by the offset portions of the horizontal wires 206, 208.

Further, the first door stop mechanism 202 and the second door stop mechanism 203 can be coupled to the horizontal wires 206 and 208, respectively. For example, the protruding portion 232 of the first door stop mechanism 202 can be coupled to the horizontal wire 206 at the point of intersection 233. Coupling the protruding portion 232 to the horizontal wire 206 can improve the structural integrity of the horizontal wire 206 while reducing deflection between the horizontal wire 206 and the protruding portion 232 of the first door stop mechanism 202. By reducing the deflection between the protruding portion 232 and the horizontal wire 206, the first door stop mechanism 202 can restrict or limit the door 114 from opening further than desired. Likewise, the protruding section of the second door stop mechanism 203 can similarly be coupled to the horizontal wire 208 in the same manner as the first door stop mechanism 202. The first and second door stop mechanisms 202, 203 create two points of contact that simultaneously restrict or limit the door 114 from moving further than desired, or stated another way, define the distance or amount by which the door 114 opens.

Figure 3:
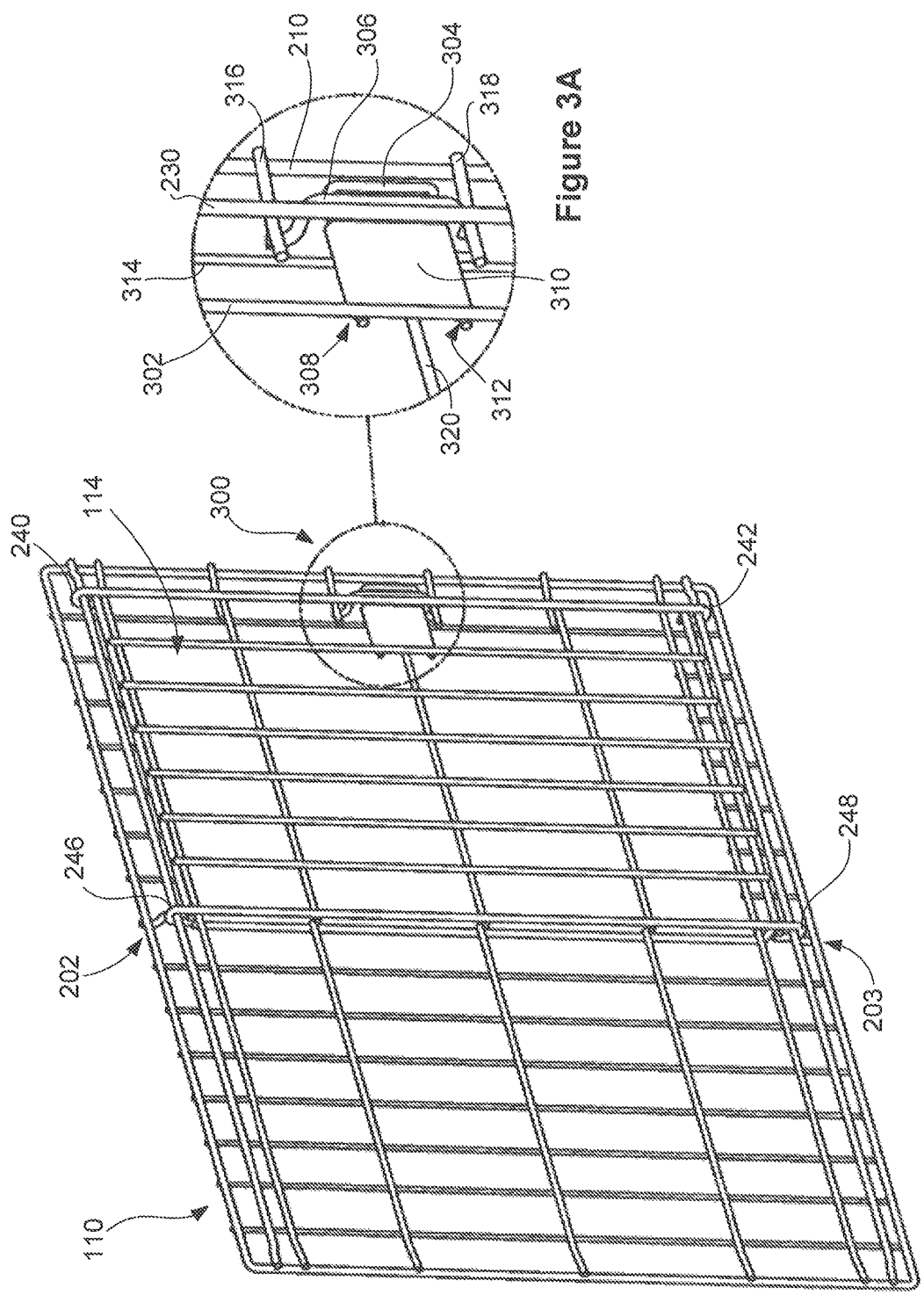
FIG. 3 is a perspective view of a first side member of the wire crate of FIG. 1 with the door in the closed position.

In this manner, the first door stop mechanism 202 and second door stop mechanism 203 can restrict movement of the door 114 from opening beyond a certain distance via interference between the door 114 and the first side member 110. The first door stop mechanism 202 and second door stop mechanism 203 can be positioned along the same vertical member 228 to ensure both door stop mechanisms 202, 203 contact the door 114 at about the same time. The door stop mechanisms 202, 203 may restrict the door 114 from opening further than desired by contacting hooks 240 and 242 when the door is in the fully open position 200. The door stop mechanisms 202, 203 may also be used to restrict the door 114 from closing farther than desired when contacted by hooked ends 246 and 248 of the door 114 as shown in FIG. 3 while a first vertical wire 230 of the door 114 simultaneously contacts a side stop member 306.

First door stop mechanism 202 and second door stop mechanism 203 can be formed in the first side member 110 at any desired location along any vertical wire of the first side member 110 in a manner that necessarily restricts movement of the door 114 when the door 114 is either opened or closed to a desired position. In FIGS. 1 and 2, the first door stop mechanism 202 and the second door stop mechanism 203 are disposed near the center of the first side member 110 such that when the door 114 is in the open position, the width of the defined opening 204 occupies about half of the entire width of the first side member 110 and when the door 114 is closed, the latch assembly 300 is positioned to allow latch member 304 to be positioned on the outer edge of side stop member 306 (i.e. to the side nearest the outer frame wire 210). This is only one embodiment, however, and this disclosure is not intended to be limited to the illustrated embodiments. One skilled in the art would understand how a plurality of different locations could be used to implement the door stop mechanisms 202, 203 or use different horizontal wires on the first side member 110 to restrict and facilitate movement of the door 114 between the open and closed positions.

To accommodate movement along the first horizontal wire 206 and second horizontal wire 208, the door 114 can include at least a first vertical wire 230 and a second vertical wire 244. The first vertical wire 230 can be disposed at one end of the door 114 and the second vertical wire 244 can be disposed at an opposite end thereof. For instance, in FIG. 2, the first vertical wire 230 is disposed near the rightside of the door 114 and the second vertical wire 244 is disposed near the leftside of the door 114. Other variations are possible, however, and the door 114 can include additional vertical wires that facilitate movement along direction 200.

The first vertical wire 230 can include a first end 240 and a second end 242. The first end 240 can form a hooked end that slidably engages the first horizontal wire 206. Likewise, the second end 242 can form a hooked end that slidably engages the second horizontal wire 208. The hooked ends 240, 242 define an opening that is appropriately sized such that the first and second horizontal wires can fit therein. Moreover, the sized openings are sufficiently large to allow for smooth movement of the hooked ends 240, 242 relative to the first and second horizontal wires 206, 208. Similarly, the second vertical wire 244 can include a first end 246 and a second end 248. The first end 246 can form a hooked end that slidably engages the first horizontal wire 206 and the second end 248 can form a hooked end that slidably engages the second horizontal wire 208. The hooked ends 246, 248 can also define openings sufficiently sized to allow for smooth movement of the hooked ends 246, 248 relative to the first and second horizontal wires 206, 208.

Referring to FIGS. 1-3, the hooked ends 240, 242, 246, 248 can be modified extensions of the vertical wires 230, 244 that form the vertical ends of the door 114. These hooked ends may be positioned to ensure the door 114 maintains a substantially planar orientation that is parallel to the side member 110 but allows the door to slide horizontally along the first horizontal wire 206 and second horizontal wire 208. Moreover, the hooked ends 240, 242 of the first vertical wire 230 may contact the door stop mechanisms 202, 203 when the door 114 reaches its fully open position (e.g., FIG. 2) and the hooked ends 246, 248 of the second vertical wire 244 may contact the door stop mechanisms 202, 203 when the door 114 reaches its fully closed position (e.g., FIGS. 1 and 3).

Figure 4:
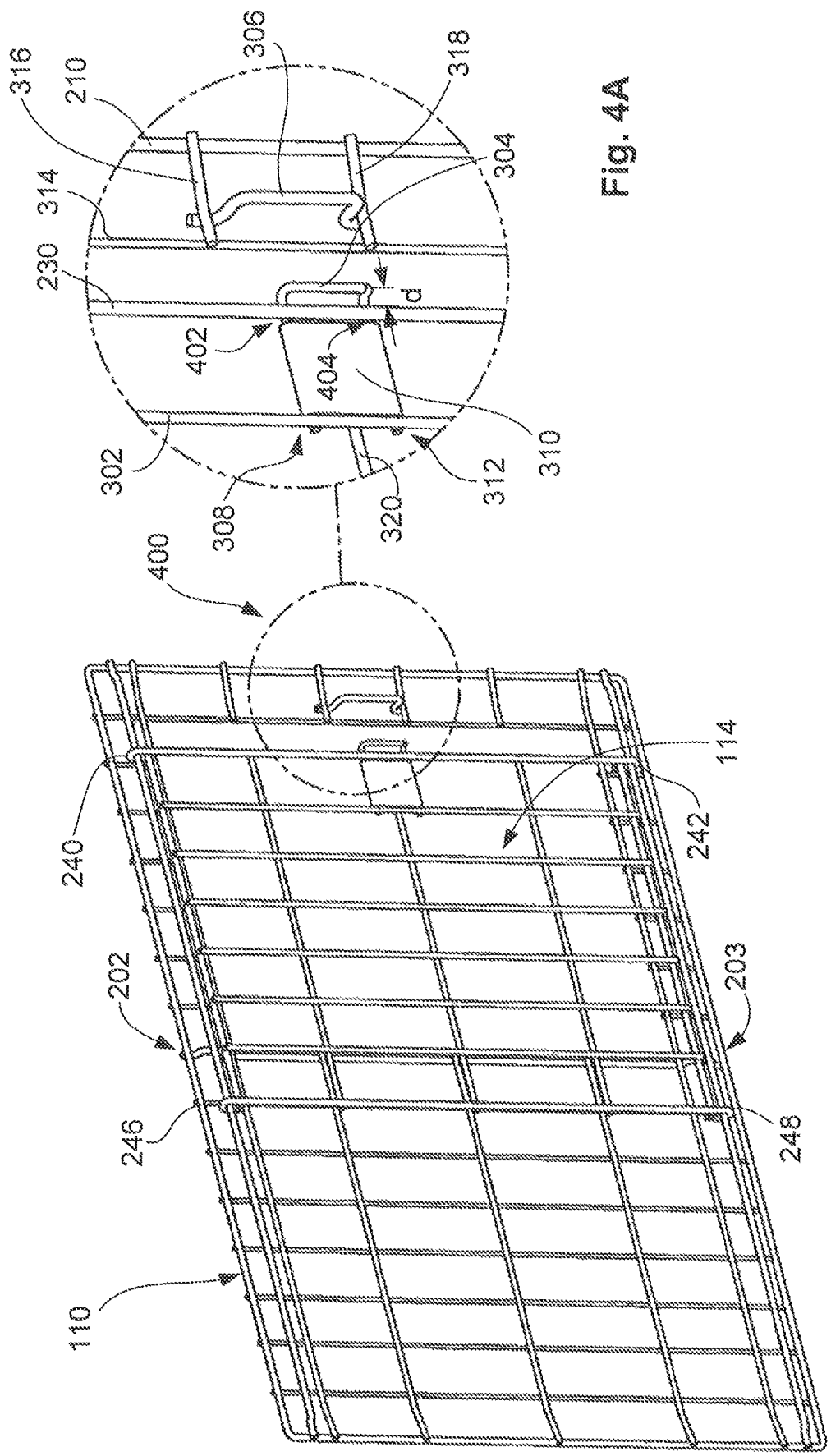
FIG. 4 is a perspective view of the first side member of FIG. 3 with the door in a partially open position.

Turning to FIGS. 2-4, the first side member 110 and door 114 can form a latch assembly 300 for securely maintaining the door 114 in the closed position (e.g., FIG. 3). The latch assembly 300 can include a contact member 310 and a latch member 304 that are coupled to the door 114. The latch member 304 can be formed by a single wire that is bent in a plurality of locations and then is coupled to a vertical wire 302 of the door 114 at a first location 308 and a second location 312. The latch member 304 may also be coupled to the first vertical wire 230 at a third location 402 and a fourth location 404. The latch member 304 can be spaced from the vertical wire 230 such that a gap or space d is defined therebetween to allow the side stop member 306 to be located in this defined gap or space d when the door 114 is in the closed position (FIG. 3). The manner in which the latch member 304 is coupled to the door 114 can be via welding, adhesive, fastener, or other known means to the skilled artisan. The contact member 310 can be coupled to the latch member 304 in any of a plurality of manners. For instance, the contact member 310 can be a substantially solid, flat piece of material that can be bent around an upper and lower portion or wire of the latch member 304 to form a press-fit coupling. The contact member 310 may also be welded, adhered, fastened, or coupled in other known ways. Moreover, the latch member 304 or contact member 310 may be coupled to a horizontal wire 320 of the door 114 for further rigidity and support of the latch assembly 300.

The latch assembly 300 may also include a portion formed on the first side member 110. In particular, the first side member 110 can include a vertical wire 314 that defines at least one side of the opening 204 (see FIG. 2). A first support wire 316 and a second support wire 318 can be horizontally disposed along the first side member 110 such that each support wire is coupled at one end to the vertical wire 314 and at an opposite end thereof to the outer frame wire 210 (see FIG. 4A). In addition, the latch assembly 300 further includes a side stop member 306 which can be formed by a single wire. The side stop member 306 can be coupled to the first support wire 316 near one end and to the second support wire 318 near an opposite end thereof. The side stop member 306 can be welded, adhered, fastened, bent in a press-fit coupling, or coupled in any other known manner to the support wires. The side stop member 306 can form a substantially U-shaped member except at each respective end where the side stop member 306 is coupled to the support wires.

In order to secure the door 114 to the first side member 110 in the closed position, the door 114 can be moved laterally in a direction 200 towards the side stop member 306. In FIG. 4, for example, the door 114 is shown partially opened. To reach the closed position, the latch member 304 and contact member 310 can be pressed inwardly towards the interior of the crate 100 while simultaneously moving the door 114 towards the side stop member 306. In doing so, the latch member 304 can move laterally to the opposing side of the side stop member 306 (i.e., to the side nearest the outer frame wire 210). When the force applied to the contact member 310 and latch member 304 is released, the latch member 304 may become disposed at a location opposite the side stop member 306 as the first vertical wire 230 contacts or engages the side stop member 306. The latching engagement of the latch member 304 and side stop member 306 can prevent the door 114 from moving or sliding to the open position (FIG. 2).

To open the latched door 114, the latch member 304 can be disengaged from the side stop member 306 by applying a force inwardly against the contact member 310 or latch member 304 while subsequently moving or sliding the door 114 along direction 200 away from the side stop member 306. While the contact member 310 is moved inwardly due to the applied force, the latch member 304 may pass behind (i.e., towards the interior of the crate 100) the side stop member 306 as the door 114 moves towards the open position. Once the latch member 304 passes by and clears the side stop member 306 (i.e. the door 114 is in a partially opened position 400), the inwardly applied force can be released and the door 114 may simply be moved in either the open or closed direction 200. The latch assembly 300 described in this embodiment is not exhaustive and should not limit its application. Many latches used in the industry such as a hook and loop, a sliding member, a wedge and spring etc. should be considered as incorporated herein.

This, of course, allows the side door 114 to be opened in such a way that the door 114 is out of the way and does not interfere with accessing the interior of the crate. In addition, the side door 114 does not swing open and risk scratching, denting, or damaging nearby objects such as walls, furniture, etc. When the side door 114 is opened, the opening 200 defined in the first side member 110 allows for access to the interior of the crate 100.

While one particular embodiment has been described utilizing a sliding door located on the first side member 100, it is to be understood that any of the top member 102, front member 106, back member 108, or second side member 112 could include a similar door and latch assembly. Moreover, one or more doors may be configured in one or more of the members so that access to the interior of the crate 100 is possible via two or more doors. In addition, the particular orientation of the different wires and direction of moving the respective door should not limit this disclosure. For instance, one skilled in the art could understand from this disclosure that a wire crate could be designed with at least one door moves vertically instead of horizontally and in any direction between. Therefore, this disclosure should be seen to encompass the plurality of door member locations and door movement directions that could be used by applying the present disclosure.

Figure 5:
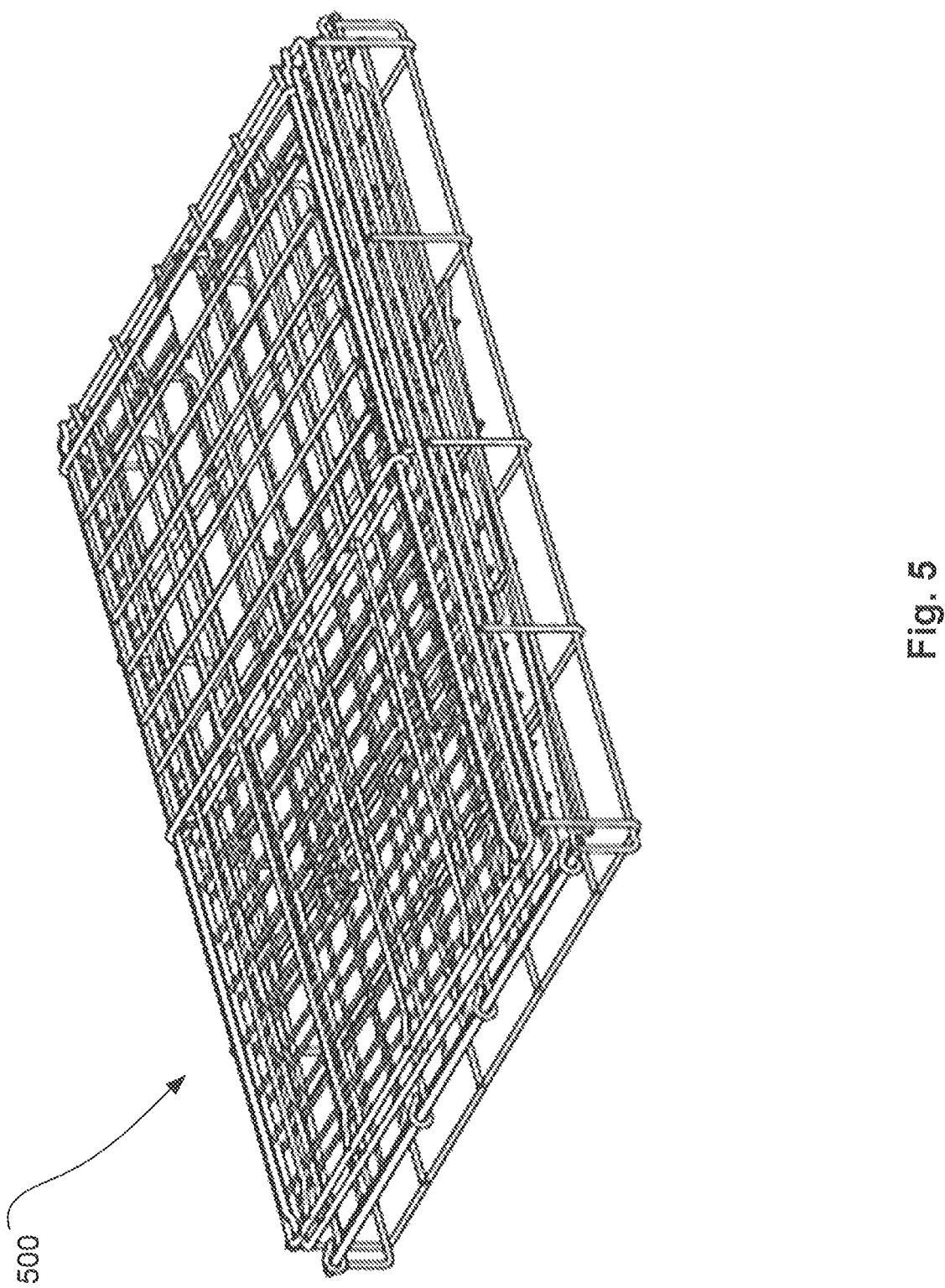
FIG. 5 is a perspective view of the wire crate of FIG. 1 in a collapsed position.

Referring to FIG. 5, the crate 100 can be easily collapsed into a compact position 500. This can enable the crate 100 to be portable, for example, in a vehicle or airplane. Moreover, the crate 100 can be easily stored in a box, carton, travelling bag, or other storage means while in the compact position 500. The crate 100 can be assembled from the collapsed or compact position 500 to an upright, assembled position as shown in FIG. 1. To do so, the bottom member 104 can be disposed on a flat surface. In this position, the front member 106 is on top with the top member 102 directly beneath the front member 106. The back member 108 can be positioned beneath the top member 102. As shown in FIG. 1, the front member 106 can be hingedly or pivotally coupled to the top member 102 via a plurality of hooks 116 engaging an outer frame wire 122 of the top member 102. Similar to the outer frame wire 210 of the first side member 110, the outer frame wire 122 of the top member 102 is an outermost, single wire that forms the dimensions of the top member 102. Like the front member 106, the back member 108 can include a plurality of hooks 124 that engage the outer frame wire 122 of the top member 102.

The front member 106 can also include a plurality of vertical wires having hooked ends 120 (FIG. 1) that overlap a horizontal wire 118 of the bottom member 104. In this arrangement, the front member 106 can be disengaged from the top member 102 by disengaging the plurality of hooks 116 from the outer frame wire 122 and pivoting the front member 106 about the horizontal wire 118 of the bottom member. In this manner, the front member 106 is removably coupled to the top member 102 and pivotally coupled to the bottom member 104. The back member 108 can include similar hooked ends for engaging a horizontal wire on the bottom member 104 such that it is similarly coupled to the top member 102 and bottom member 104 as the front member 106.

Thus, based on the connections between the front member 106 and back member 108 relative to the top member 102 and bottom member 104, the crate 100 can be assembled to its upright position of FIG. 1 by pivoting the front member 106 about the horizontal wire 118 of the bottom member 104 and then lifting the top member 102. The top member 102 can be lifted to a position so that the back member 108 can be pivoted about the bottom member 104 to a substantially upright position. Once the front member 106 and back member 108 are pivoted to substantially upright positions, the plurality of hooks 116 on the front member 106 and plurality of hooks 124 on the back member 108 can be engaged to the outer frame wire 122 of the top member 102 to complete the assembly of the crate 100.

To collapse the crate 100 from the upright position of FIG. 1 to the collapsed or compact position 500 of FIG. 5, the steps above can be reversed. Namely, the front member 106 and back member 108 can be disengaged from the top member 102. One of the front member 106 and back member 108 can be pivoted relative to the bottom member 104 and disposed in a position above the bottom member 104. The first side member 110 and second side member 112 can pivot relative to the top member 102 and bottom member 104 and collapse on top of the previously collapsed front member 106 or back member 108. The uncollapsed front member 106 or back member 108 can then be folded on top of the other members to fully collapse the crate to its compact position 500.

In the previously described embodiment, the front and back members can be removably coupled to the top member 102. In another embodiment, the front and back members can be removably coupled to the bottom member 104. Moreover, the first side member 110 and second side member 112 are pivotally coupled to the top member 102 and bottom member 104 to form a continuous structure. In an alternative embodiment, however, the front and back members can be pivotally coupled to the top and bottom members to form a continuous structure. In this alternative embodiment, the first side member 110 and second side member 112 can be removably coupled to one of the top member 102 and bottom member 104 so that the crate 100 can be collapsed to its compact position 500 of FIG. 5. In yet another alternative embodiment, each of the front member 106, back member 108, first side member 110, and second side member 112 can be removably coupled to the top member 102 and bottom member 104. Here, each of the six members can be completely disengaged from one another and stacked on top of one another to form a compact structure. Or, the top member 102 and bottom member 104 can be removably coupled to one of the front member 106, back member 108, first side member 110, and second side member 112 and the front member 106, back member 108, first side member 110, and second side member 112 can form a continuous structure.

In a similar embodiment, the first side member 110 and second side member 112 can be folded inwardly on top of the bottom member 104. In this configuration, the front member 106, top member 102, and back member 108 are collapsed on top of the first side member 110 and second side member 112. The first side member 110 and second side member 112 can be hingedly or pivotally coupled to the bottom member 104 to accommodate this means for collapsing the crate 100. These members can be removably coupled or fixedly coupled to the bottom member 104. As such, in another related embodiment, it can be possible for the top member 102, front member 106, and back member 108 to first collapse on top of the bottom member 104 and then for the first side member 110 and second side member 112 to fold on top thereof, with either the first side member 110 or second side member 112 resting on top of the other.

As another method for assembling the crate from the collapsed position, the top member 102 can be lifted away from the front member 106 to a position in which the top member 102 is substantially parallel and directly above the bottom member 104. In this position, the front member 106 and back member 108 are substantially upright and parallel to one another. Once the top member 102, front member 106, and back member 108 are arranged in their upright positions, the first side member 110 and second side member 112 can be assembled. In one exemplary embodiment, the first side member 110 can be latched to the second side member 112 via a hook or other fastener (not shown), and to assemble, the two side members are disengaged from one another. The first side member 110 can then be raised to an upright position. The first side member 110 can be coupled to the top member 102 in a plurality of ways including as previously described. For instance, one such way is by aligning hooks which extend outward from the first side member 110 with an end wire on the top member 102. Clips or other fasteners may also be used for coupling the first side member 110 to the top member 102 and/or the front member 106 and back member 108.

Similarly, the second side member 112 can be lifted from its collapsed position to an upright position. In its upright position, the second side member 112 can be coupled to the top member 102 by aligning hooks near the top edge of the member with an end wire of the top member 102. Clips or other fasteners may be used to further couple the second side member 112 to the top member 102 and/or front member 106 and back member 108. The members may be coupled in other ways known to the skilled artisan. For instance, in another embodiment, the top member 102 can include hooks that engage the first side member 110 and second member 112.

Figure 6:
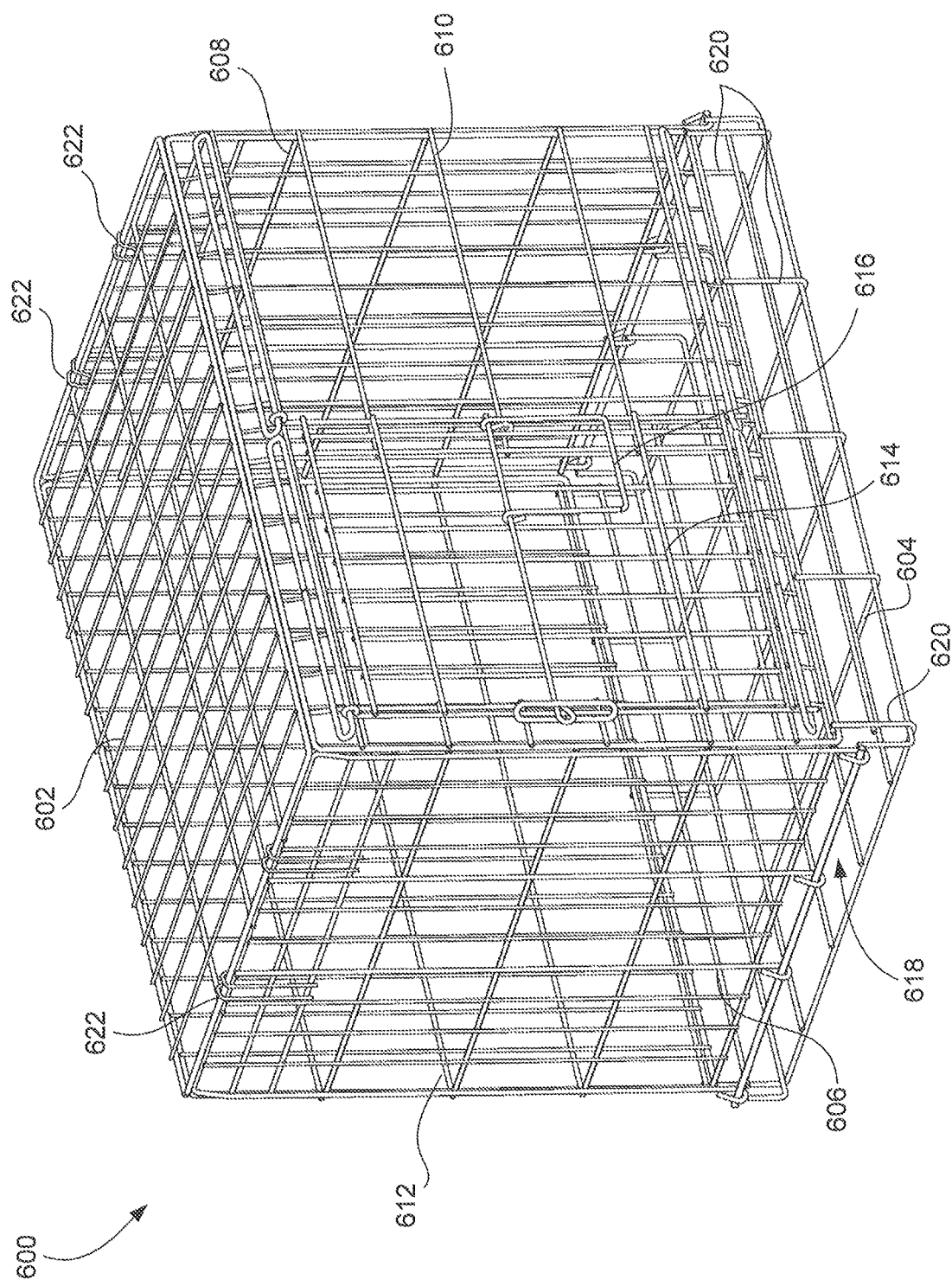
FIG. 6 is a perspective view of another wire crate.

Referring to FIG. 6, another embodiment of a crate 600 is shown. The crate 600 can be formed of substantially horizontal and vertical wires that overlap one another to define an interior portion. One or more of the horizontal wires can be coupled to one or more of the vertical wires, and vice versa, to add structural integrity to the crate 600. For instance, the wires may be welded, adhered, fastened, or coupled to one another through a variety of means. The crate 600 can include a top member 602, a bottom member 604, a front member 606, and a back member 608. The crate 600 can further include a first side member 610 and a second side member 612, where the first side member 610 is oppositely disposed from the second side member 612. The dimensions of each member can vary to accommodate the size of any animal, for example. In an upright, fully assembled orientation or position, the top member 602, bottom member 604, front member 606, back member 608, first side member 610, and second side member 612 can define an interior of the crate 600 which is sized to receive and accommodate an animal or other object, as desired.

In one aspect, the front member 606, back member 608, top member 602, and bottom member 604 can form a continuous structure. In other words, these members can be fixedly attached to one another. Alternatively, the top member 602, bottom member 604, first side member 610, and second side member 612 can form a continuous structure such that the top member 602 and bottom member 604 are affixed to the first side member 610 and second side member 612. In a different aspect, each member may be removably coupled to one another such that the different members are removably coupled to one another. In the illustrated example of FIG. 6, a plurality of clips 622 can be used to fasten or couple the top member 602 to the front member 606 and the back member 608. Similar clips or fasteners can be used to couple the other members of the crate 600.

Each of the top member 602, bottom member 604, front member 606, back member 608, first side member 610, and second side member 612 can be formed by a plurality of overlapping horizontal and vertical wires or rods. The number of horizontal and vertical wires as well as the spacing therebetween can vary. If a smaller animal is being contained in the crate 600, the spacing may be desirably smaller than if a larger animal is being contained.

In FIG. 6, the first side member 610 of the crate 600 can define a door frame which includes corresponding structure for accommodating a door 614. The door 614 can also be made of substantially overlapping horizontal and vertical wires as shown in FIG. 6. Further, the door 614 can be movably disposed between an open position and a closed position. In the open position, i.e., in FIG. 9, the first side member 610 defines an opening 902 that provides access to the interior of the crate 600.

The crate 600 can further include a latch assembly 616 pivotably coupled to the door 614 to be releasably coupled to the first side member 610 to maintain or latch the door 614 in a closed position 800. The first side member 610 can form a portion of a door frame for the door 614, and as shown in FIG. 6 can be formed by a plurality of horizontally and vertically disposed wires.

The front member 606 can be offset or spaced from the bottom member 604 to define a slot or opening 618 therebetween. In this manner, a pan (not shown), tray, pet bed, blanket or other apparatus can be slidably positioned above the bottom member 604 in the opening 618. In this manner, an animal being contained within the crate 600 can rest on a more comfortable pet bed, comforter, tray, pan, etc. In the embodiment of FIG. 6, the first side member 610 and the second side member 612 can include support wires 620 disposed in connection with the bottom member 604 to prevent the pet bed (not shown) from shifting laterally from the confined space. The back member 608 can also include similar support wires 620 to further position the pet bed, tray, pan, etc. within the defined opening 618. In this configuration, the pan, bed, tray, etc. may only be positioned within the defined opening 618 in the front member 606. Although not shown, the crate 600 can further include a latch or other mechanism to prevent the bed, pan, tray, etc. from sliding or moving out of position via the opening 618 (i.e., due to movement of the animal inside the crate).

Figure 7A:
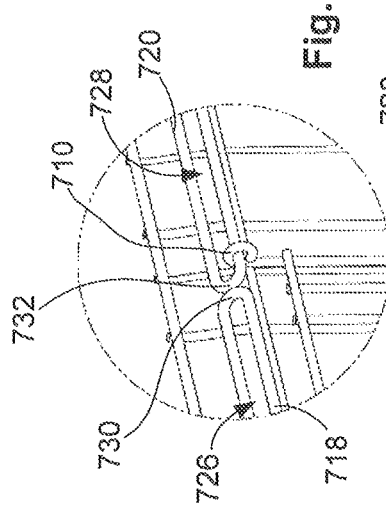
FIG. 7A is a partial enlarged perspective view of the door frame and door of FIG. 7.
Figure 7:
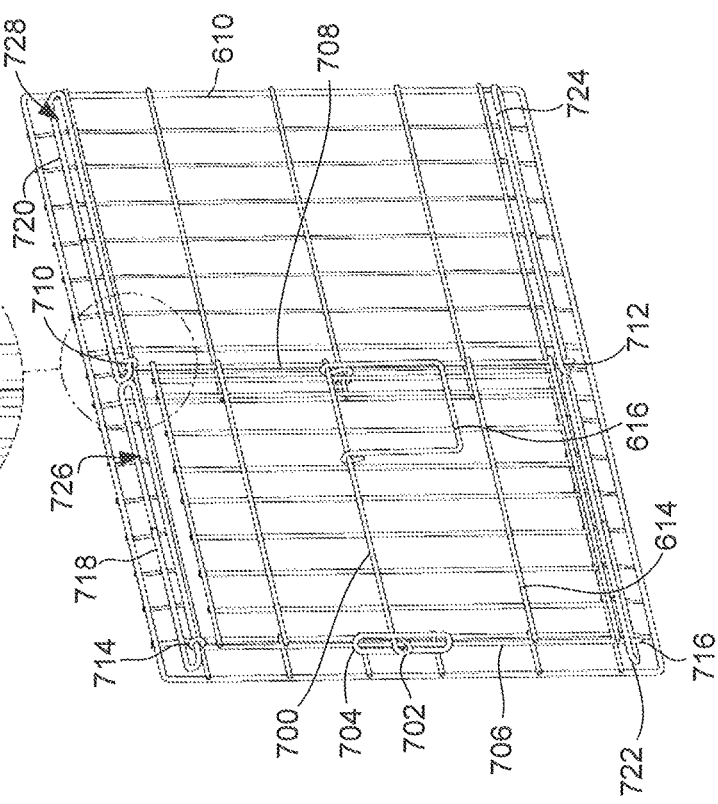
FIG. 7 is a perspective view of a door frame and door of the wire crate of FIG. 6.

In FIG. 7, the first side member 610 and door 614 are shown in greater detail. The first side member 610 can form a door frame for the door 614 such that the door 614 is slidably coupled thereto. As described above and shown in the illustrated embodiment of FIG. 7, the door 614 can be formed by a plurality of interconnected horizontal and vertical wires. For instance, the door 614 can include a first horizontal wire 700 that extends from one end of the door 614 to the other end. The first horizontal wire 700 can include a bent end 702 as shown. The bent end 702 can have a degree of elasticity such that it can be elastically moved inward and outward (i.e., towards and away from the first side member 610.

The first side member 610 can include a catch member 704 formed by a single, oval-shaped wire. The catch member 704 defines an opening therein that can receive the bent end 702 of the first horizontal wire 700 in a latched position. The bent end 702 can bias outwardly away from the first side member 610 such that when positioned in the defined opening of the catch member 704, the catch member 704 can substantially restrain or hold the bent end 702 in a position to prevent the door 614 from easily being slid or moved from the closed position 800.

The door 614 can also include a first vertical wire 706 and a second vertical wire 708. The first vertical wire 706 and the second vertical wire 708 are disposed at opposite ends of the door 614, where the bent end 702 of the first horizontal wire is coupled to the first vertical wire 706. In one aspect, the bent end 702 can be coupled near or at the midpoint or center of the first vertical wire 706. The first vertical wire 706 includes two ends, with a first end 714 forming a curled end and the second end 716 being substantially straight. Similarly, the second vertical wire 708 includes two ends, with a first end 710 forming a curled end and the second end 712 being substantially straight.

To accommodate the sliding or lateral movement of the door 614 relative to the first side member 610, the first side member 610 can include a plurality of tracks or guides. For example, in FIG. 7, the first side member 610 can include a first guide member 718, a second guide member 720, a third guide member 722, and a fourth guide member 724. As shown in both FIGS. 7 and 7A, the first guide member 718 and the second guide member 720 are formed as substantially oval or looped shaped structures. The first guide member 718 can define a first guide opening 726 and the second guide member 720 can define a second guide opening 728. Although not shown, the third guide member 722 and fourth guide member 724 can also form similar defined guide openings therein. These oval-shaped structures, however, are only shown as illustrative examples. The guide members can be bent, curved, or otherwise formed to provide guide wires, tracks, channels, openings, etc.

Each guide opening has a first end and a second end defined by the respective guide member. In FIG. 7A, for example, the first guide member 718 has an end 730 that defines one end of the guide opening 726. Likewise, the second guide member 720 has an end 732 that defines one end of the guide opening 728. The respective ends 730, 732 can abut one another such that both guide members 718, 720 are in contact with one another or are spaced from one another such that a gap exists between each respective end 730, 732. In this manner, the length of travel of the door 614 can be defined by the distance between the respective ends of the guide openings (i.e., the travel distance along the first guide member 718 is defined between ends 908 and 730, and the travel distance along the second guide member 720 is defined between ends 910 and 732).

As also shown in the illustrative embodiments of FIGS. 6-9, the first guide member 718, the second guide member 720, the third guide member 722, and the fourth guide member 724 can each be formed by a single wire. As such, each wire can be bent, curled, or otherwise formed to define how the door 614 moves laterally with respect to the first side member 610.

As shown in FIGS. 7 and 7A, the first end 714 of the first vertical wire 706 forms a loop or curled end such that the first end 714 is coupled to the first guide member 718. Likewise, the first end 710 of the second vertical wire 708 forms a loop or curled end that is coupled to the second guide wire 720. The first ends of both vertical wires can slide relative to the first guide member 718 and second guide member 720 to allow the door 614 to move between the closed position 800, an open position 900, and any position therebetween.

The first vertical wire 706 can have a length such that the second end 716 thereof protrudes through the defined opening of the third guide member 722. Similarly, the second vertical wire 708 can have a length such that the second end 712 can protrude through the defined opening of the fourth guide member 724. In this configuration, an animal cannot push the door 614 outward due to the interference created by the second ends of both vertical wires being at least partially captured in the defined openings of both guide members.

While the guide members are shown as forming loop or oval like structures, this is only illustrated as one example. In other examples, the first and second guide members can be single, substantially straight wires along which the first ends of both vertical wires slide. The third and fourth guide members may also be a single wire that is disposed outwardly from the first side member 610 such that the second ends of both vertical wires is disposed between respective guide wire and the first side member 610. Other tracks, channels, guides, etc. can be used to facilitate substantially linear movement of the door 614 relative to the first side member 610.

Figure 9:
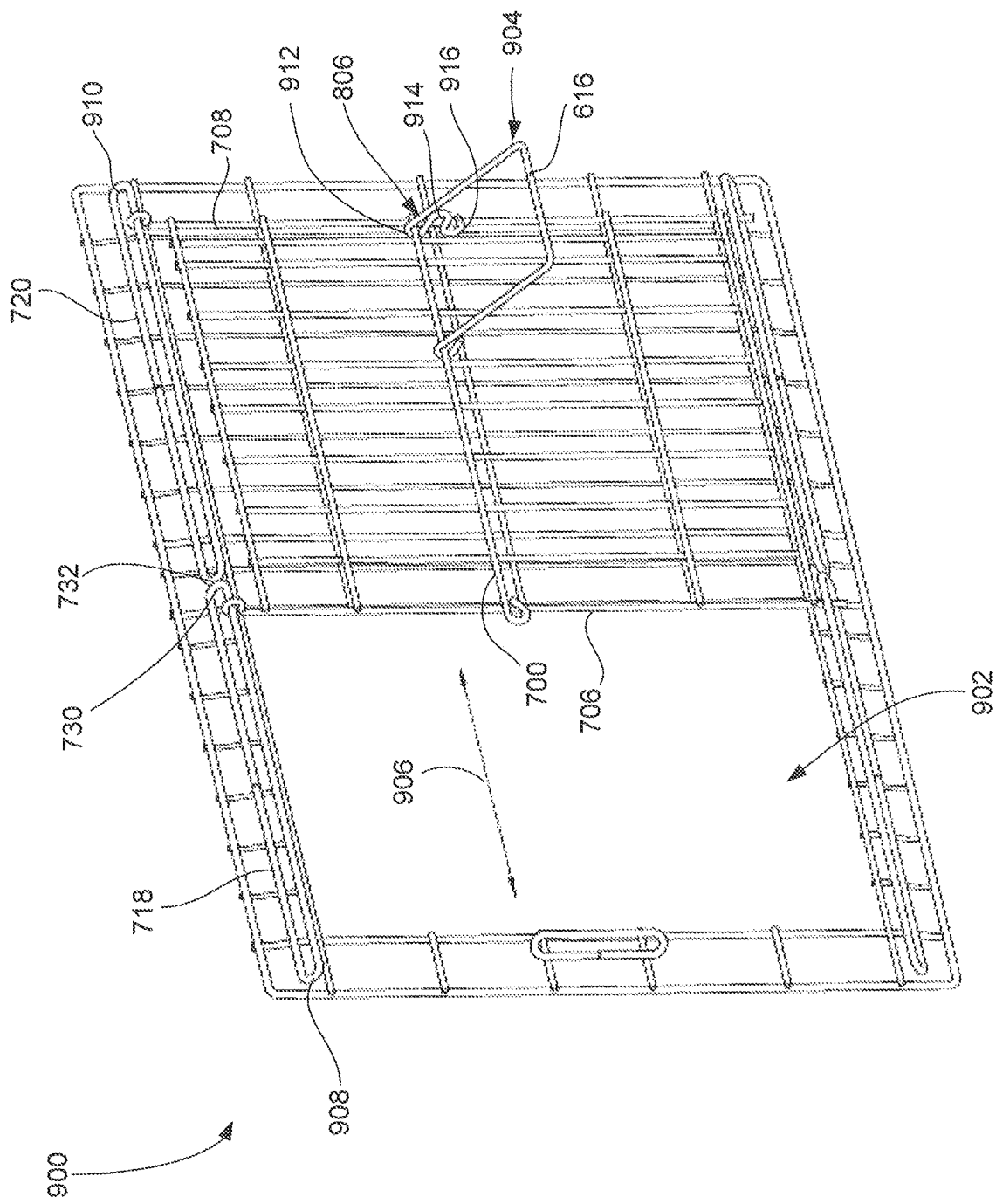
FIG. 9 is a perspective view of the door frame and door of FIG. 7 in an open position.

In the illustrated embodiments of FIGS. 8, 8A, and 9, the latch 616 is shown as being released or decoupled from the first side member 610 to further facilitate movement of the door 614 relative to the first side member 610. The latch 616 can include a first end 814 and a second end 816 that are pivotally coupled to the first horizontal wire 700 of the door 614. The second end 816 of the latch 616 can further include a latching mechanism 806 in the form of a bend or curve in a wire. In FIG. 9, the latch 616 and latching mechanism 806 are shown as being formed by a single wire. The single wire can include a first bend 912, a second bend 914, and a third bend 916. The first bend 912 can be defined at approximately the same location along the single wire as the second end 816, where the latch 616 is pivotably coupled to the first horizontal wire 700 of the door 614.

In the closed position 800 of FIGS. 7 and 8, a horizontal wire 804 of the first side member 610 can be coupled or latched by the latching mechanism 806. Here, the second bend 914 can define an opening for receiving the horizontal wire 804 of the first side member 610 or door frame. The latching mechanism 806 can prevent or limit movement of the door 614 in the lateral direction when the latching mechanism 806 engages or couples to the horizontal wire 804. To release the latching mechanism 806, the latch 616 is pivoted to the position 802 shown in FIG. 8, whereby the latching mechanism 806 is clear and no longer coupled to the horizontal wire 804.

Once the latching mechanism 806 is decoupled from the horizontal wire 804, the door 614 can be moved from the closed position 800 by also releasing or decoupling the bent end 702 of the first horizontal wire 700 from the catch member 704. As shown in FIG. 8A, the catch member 704 can be a single wire coupled to a first support wire 808 and a second support wire 812 of the first side member 610. As shown, the first and second support wires can be substantially horizontal wires to which the catch member 704 can be welded, fastened, adhered, or coupled in other known ways. The catch member 704 can define an opening 810 through which the bent end 702 is disposed in the closed position 800. Since the bent end 702 can be elastically biased or deformed away from the door 614 to thereby latch or couple to the catch member 704, to move the door 614 from the closed position 800 the bent end 702 can be pushed inward to release or disengage the door 614 from the catch member 704.

Referring to FIG. 9, the door 614 is shown in the open position 900. In this position, an opening or access 902 is defined between the door 614 and the first side member 610. The size of the opening or access 902 can be varied by moving the door 614 in the direction indicated by arrow 906. In addition, the latch 616 remains in a pivot position 904 to prevent the latching mechanism 806 from engaging the horizontal wire 804 of the first side member 610. Since each of the plurality of vertical wires of the first side member 610 is spaced, the door 614 can be moved to and maintained in a partially open position by coupling the latching mechanism 806 with the horizontal wire 804 at approximately any location along its length between any two of the plurality of vertical wires that form the first side member 610.

As described above and also shown in FIG. 9, the first guide member 718 can be formed by a single wire. The first end 714 of the first vertical wire 706 can move along the first guide member 718, and the length of travel can be defined by the length of the first guide member 718. The first guide member 718 can include one end 730 and an opposite end 908 such that the first end 714 of the first vertical wire 706 can travel the length defined by the distance between the first end 730 and second end 908. Likewise, the second guide member 720 can be formed by a single wire having a length defined between a first end 732 and a second end 910. The distance between the first end 732 and the second end 910 can define the length of travel by the first end 710 of the second vertical wire 708. In one aspect, the lengths of the first guide member and the second guide member is about the same. In other words, the first ends of both vertical wires of the door 614 can travel about the same distance between the open and closed positions. In other embodiments, the lengths may differ and thus the lateral movement of the door 614 is defined by the smaller of the two openings.

In another example, the third guide member 722 can define a length that is similar to or the same as the length of the first guide member 718. The fourth guide member 724 can have approximately the same length as the second guide member 720. In other examples, the lengths or opening sizes of the guide members may differ, and the guide member having the shortest of the lengths or opening sizes can define the travel distance of the door 614.

The crate 600 can also be collapsed into a collapsed position similar to that of FIG. 5. The crate 600 can also include a tray or pan that can be removably positioned or coupled to the crate.

Referring to FIG. 10, yet another embodiment of a collapsible crate 1000 is shown. The crate 1000 can be formed of substantially horizontal and vertical wires that overlap one another to define an interior portion. One or more of the horizontal wires can be coupled to one or more of the vertical wires, and vice versa, to add structural integrity to the crate 1000. For instance, the wires may be welded, adhered, fastened, or coupled to one another through a variety of means. The crate 1000 can include a top member 1002, a bottom member 1004, a front member 1006, and a back member 1008. The crate 1000 can further include a first side member 1010 and a second side member 1012, where the first side member 1010 is oppositely disposed from the second side member 1012. The dimensions of each member can vary to accommodate the size of any animal, for example. In an upright, fully assembled orientation or position, the top member 1002, bottom member 1004, front member 1006, back member 1008, first side member 1010, and second side member 1012 can define an interior of the crate 1000 which is sized to receive and accommodate an animal or other object, as desired.

In one aspect, the front member 1006, back member 1008, top member 1002, and bottom member 1004 can form a continuous structure. In other words, these members can be fixedly attached to one another. Alternatively, the top member 1002, bottom member 1004, first side member 1010, and second side member 1012 can form a continuous structure such that the top member 1002 and bottom member 1004 are affixed to the first side member 1010 and second side member 1012. In a different aspect, each member may be removably coupled to one another such that the different members are removably coupled to one another. In the illustrated example of FIG. 10, a plurality of clips 1022 can be used to fasten or couple the top member 1002 to the front member 1006 and the back member 1008. Similar clips or fasteners can be used to couple the other members of the crate 1000.

Each of the top member 1002, bottom member 1004, front member 1006, back member 1008, first side member 1010, and second side member 1012 can be formed by a plurality of overlapping horizontal and vertical wires or rods. The number of horizontal and vertical wires as well as the spacing therebetween can vary. If a smaller animal is being contained in the crate 1000, the spacing may be desirably smaller than if a larger animal is being contained.

In FIG. 10, the first side member 1010 of the crate 1000 can define a door frame which includes corresponding structure for accommodating a door 1014. The door 1014 can also be made of substantially overlapping horizontal and vertical wires as shown in FIG. 10. Further, the door 1014 can be movably disposed between an open position 1200 and a closed position 1100. In the open position, i.e., in FIG. 12, the first side member 1010 defines an opening 1202 that provides access to the interior of the crate 1000.

The crate 1000 can further include a latch assembly 1016 pivotably coupled to the door 1014 to be releasably coupled to the first side member 1010 to maintain or latch the door 1014 in a closed position 1100. The first side member 1010 can form a portion of a door frame for the door 1014, and as shown in FIG. 10 can be formed by a plurality of horizontally and vertically disposed wires.

The front member 1006 can be offset or spaced from the bottom member 1004 to define a slot or opening 1018 therebetween. In this manner, a pan (not shown), tray, pet bed, blanket or other apparatus can be slidably positioned above the bottom member 1004 in the opening 1018. In this manner, an animal being contained within the crate 1000 can rest on a more comfortable pet bed, comforter, tray, pan, etc. In the embodiment of FIG. 10, the first side member 1010, the second side member 1012, and/or the bottom member 1004 can include support wires 1020 disposed in connection with the bottom member 1004 to prevent the pet bed (not shown) from shifting laterally from the confined space. The back member 1008 can also include similar support wires 1020 to further position the pet bed, tray, pan, etc. within the defined opening 1018. In this configuration, the pan, bed, tray, etc. may only be positioned within the defined opening 1018 in the front member 1006. Although not shown, the crate 1000 can further include a latch or other mechanism to prevent the bed, pan, tray, etc. from sliding or moving out of position via the opening 1018 (i.e., due to movement of the animal inside the crate).

Figure 11A:
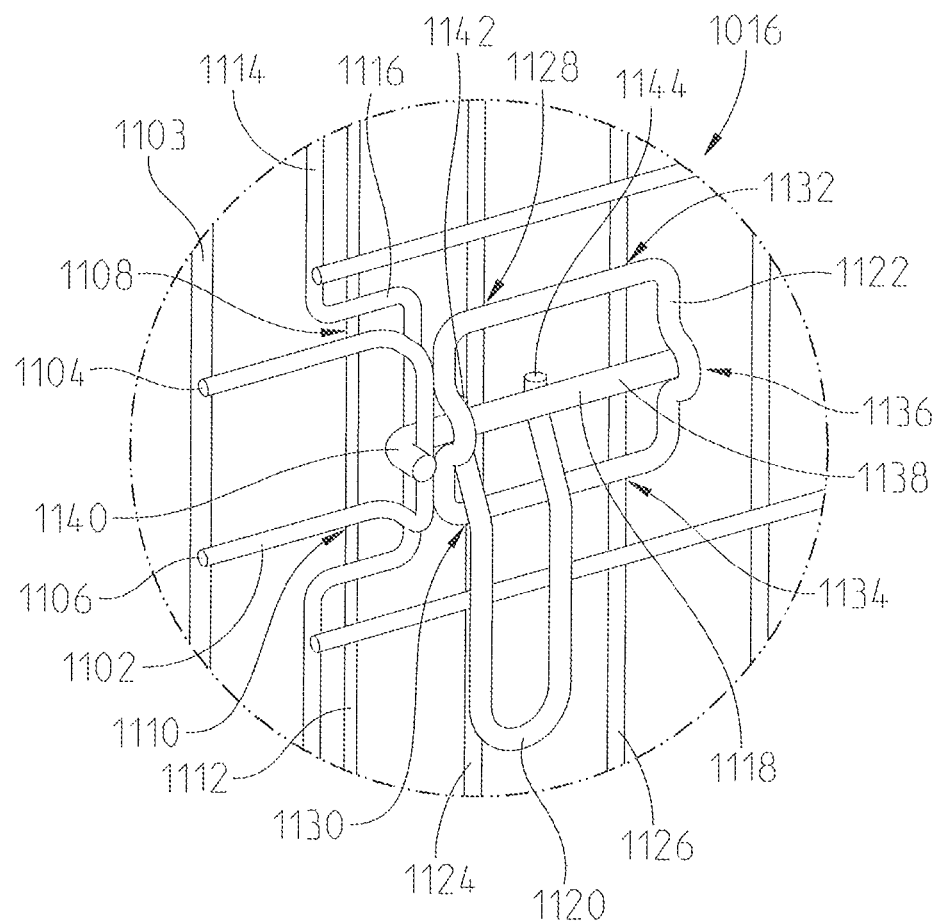
FIG. 11A is a partial enlarged perspective view of the door frame and door of FIG. 11.

In FIGS. 11 and 11A, the first side member 1010 and door 1014 are shown in greater detail. The first side member 1010 can form a door frame for the door 1014 such that the door 1014 is slidably coupled thereto. A substantially U-shaped catch member 1102 can be coupled to the first side member 1010. The catch member 1102 is coupled to the first side member 1010 via an outer wire 1103 at a first end 1104 and a second end 1106. In this embodiment, the catch member 1102 forms an open-ended structure in which the first end 1104 and second end 1106 are spaced from one another and coupled to the outer wire 1103.

A fixed vertical wire 1112 can be disposed adjacent to and parallel with the outer wire 1103 of the first side member 1010, and the wire 1112 may define one edge of the door frame. The catch member 1102 can also be coupled to the fixed vertical wire 1112 at a first location 1108 and a second location 1110 for stability. The catch member 1102 may be formed of a single or multiple wires. In the embodiment of FIG. 11, the first end 1104 may be axially aligned with the first location 1108, and the second end 1106 may be axially aligned with the second location 1110. In one example, the axis along which the first end 1104 and first location 1108 are aligned may be substantially parallel to the axis along which the second end 1106 and the second location 1110 are aligned.

The catch member 1102 may be bent and protrudes outwardly from the first side member 1010 (i.e., in a direction away from the interior of the crate) as shown in FIG. 11A. Thus, the catch member 1102 may be aligned partially within a first plane and a second plane, where the first and second planes may be approximately perpendicular to one another.

The sliding mechanism for the door 1014 of crate 1000 is substantially similar to the sliding mechanism of the previously described embodiment shown in FIGS. 6-9. The first guide member 718, second guide member 720, third guide member 722, and fourth guide member 724 are coupled to the first side member 1010 and guide the lateral movement of the door 1014 as it opens and closes. As shown in FIG.

11, the first guide member 718 and the second guide member 720 are formed as substantially oval or looped shaped structures. The first guide member 718 can define a first guide opening 726 and the second guide member 720 can define a second guide opening 728. Although not shown, the third guide member 722 and fourth guide member 724 can also form similar defined guide openings therein. These oval-shaped structures, however, are only shown as illustrative examples. The guide members can be bent, curved, or otherwise formed to provide guide wires, tracks, channels, openings, etc.

Each guide opening has a first end and a second end defined by the respective guide member. For example, the first guide member 718 has an end 730 that defines one end of the guide opening 726. Likewise, the second guide member 720 has an end 732 that defines one end of the guide opening 728. The respective ends 730, 732 can abut one another such that both guide members 718, 720 are in contact with one another or are spaced from one another such that a gap exists between each respective end 730, 732. In this manner, the length of travel of the door 1014 can be defined by the distance between the respective ends of the guide openings (i.e., the travel distance along the first guide member 718 is defined between ends 908 and 730, and the travel distance along the second guide member 720 is defined between ends 910 and 732).

Figure 12:
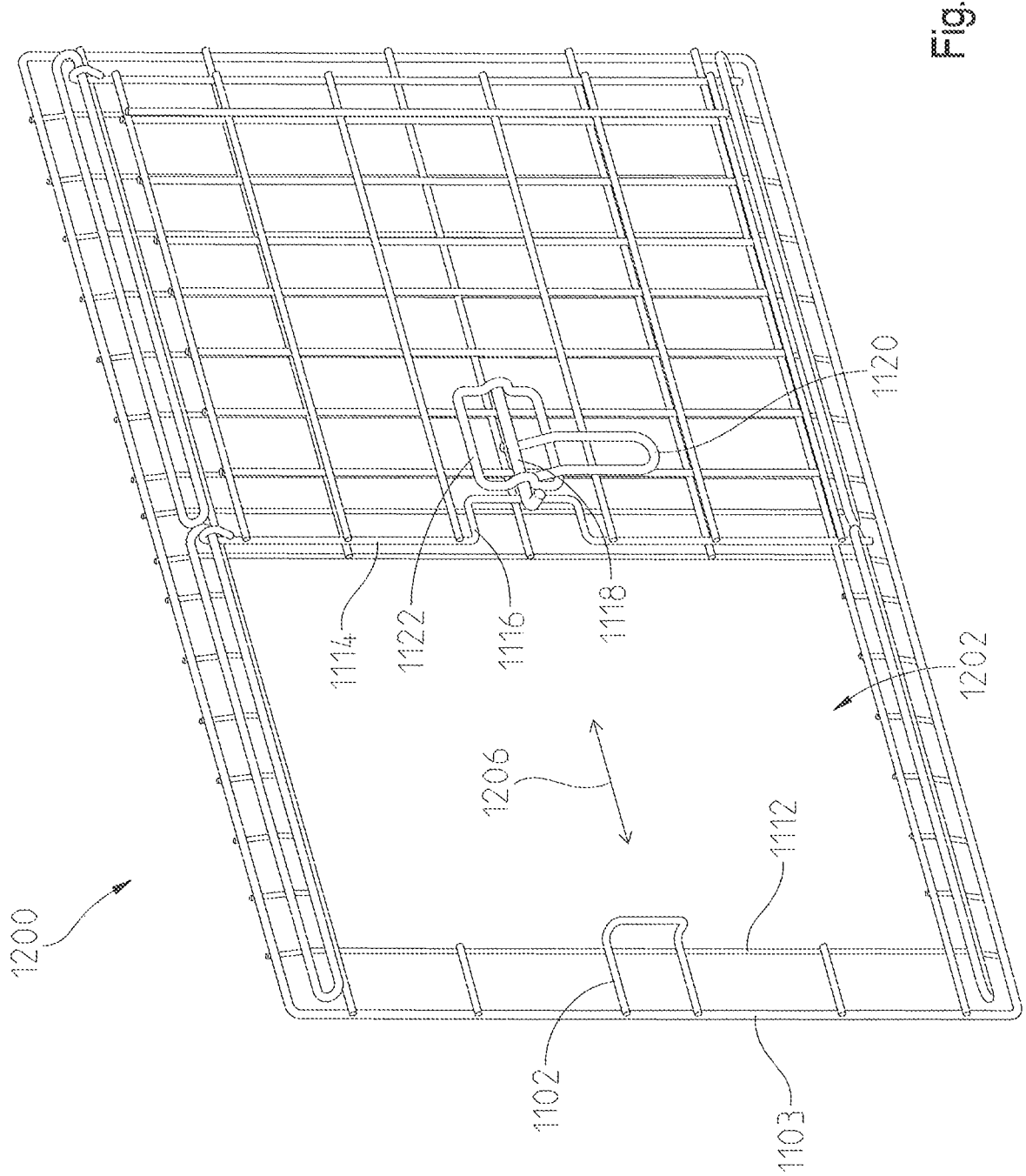
FIG. 12 is a perspective view of the door frame and door of FIG. 10 in an open position.

As also shown in the illustrative embodiments of FIGS. 10-12, the first guide member 718, the second guide member 720, the third guide member 722, and the fourth guide member 724 can each be formed by a single wire. As such, each wire can be bent, curled, or otherwise formed to define how the door 1014 moves laterally with respect to the first side member 1010.

Further, the functionality and features of the second vertical wire 708 of the crate 600 may be incorporated in the illustrated crate 1000 of FIG. 10. The curled end 710 of the second vertical wire 708 slidably couples with the second guide wire 720 in the guide opening 728. The straight end 712 fits into the guide opening of the fourth guide member 724 simultaneously. Similarly, a first vertical wire 1114 has a curled end 714 that fits in the guide opening 726 and slidably couples with the first guide member 718. Additionally, the straight end 716 of the first vertical wire 1114 fits into the guide opening and slidably couples with the third guide member 722.

The first vertical wire 1114 differs from the first vertical wire 706 of previous embodiments (shown in FIGS. 6-9) in that it contains a U-shaped bend 1116 between the curled end 714 and the straight end 716. The U-shaped bend 1116 of the first vertical wire 1114 can mirror the contour of the bend formed by the substantially U-shaped design of the catch member 1102 such that the catch member 1102 and the first vertical wire 1114 lie partially on the same plane, but do not interfere with one another. When the door 1014 is in the closed position 1100, U-shaped bend 1116 of the first vertical wire 1114 forms a recessed area in which the catch member 1102 is received. As such, the catch member 1102 may or may not contact the first vertical wire 1114, but whether there is contact or not the two do not interfere with the functionality of the latch 1016 due to the outward bend defined in the U-shaped portion of the catch member 1102.

As shown in FIG. 11, the first end 714 of the first vertical wire 1114 forms a loop or curled end such that the first end 714 is coupled to the first guide member 718. Likewise, the first end 710 of the second vertical wire 708 forms a loop or curled end that is coupled to the second guide wire 720. The first ends of both vertical wires can slide relative to the first guide member 718 and second guide member 720 to allow the door 1014 to move between the closed position 1100, an open position 1200, and any position therebetween.

The first vertical wire 1114 can have a length such that the second end 716 thereof protrudes through the defined opening of the third guide member 722. Similarly, the second vertical wire 708 can have a length such that the second end 712 can protrude through the defined opening of the fourth guide member 724. In this configuration, an animal cannot push the door 1014 outward due to the interference created by the second ends of both vertical wires being at least partially captured in the defined openings of both guide members.

While the guide members are shown as forming loop or oval like structures, this is only illustrated as one example. In other examples, the first and second guide members can be single wires along which the first ends of both vertical wires slide. The third and fourth guide members may also be a single wire that is disposed outwardly from the first side member 1010 such that the second ends of both vertical wires is disposed between respective guide wire and the first side member 1010. Other tracks, channels, guides, etc. can be used to facilitate substantially linear movement of the door 1014 relative to the first side member 1010.

FIG. 11A demonstrates the latch assembly 1016 when it is in the closed position 1100. The latch assembly 1016 may include three components: a bolt 1118, a lever 1120, and a latch component 1122. The latch component 1122 is the base of the latch assembly 1016 and can include a wire bent into a substantially rectangular shape. Other possible designs of the latch component 1122 may include oval, square, circle, or other known shape. A first latch wire 1124 of the door 1014 is disposed adjacent to and spaced from the first vertical wire 1114. The latch component 1122 can be coupled to the first latch wire 1124 at a first latch location 1128 and a second latch location 1130. A second latch wire 1126 can be adjacent to and spaced from the first latch wire 1124. The latch component 1122 can also be attached to the second latch wire 1126 at a third latch location 1132 and a fourth latch location 1134. Depending on the spacing between the vertical wires of the door 1014, the latch component 1122 can be coupled at more than just four locations. In one aspect, the first and third latch locations 1128, 1132 may be aligned with the first location 1108 and the first end 1104 of the catch member 1102. Additionally, the second and fourth latch locations 1130, 1134 may be aligned with the second location 1110 and the second end 1106 of the catch member 1102.

In one aspect, substantially straight portions of the latch component 1122 may lie between the first latch location 1128 and the third latch location 1132 and also between the second latch location 1130 and the fourth latch location 1134. To accommodate the bolt 1118, the latch component may define two bolt openings 1136. The bolt openings 1136 can include a first bolt opening defined between the first latch location 1128 and the second latch location 1130, and a second bolt opening defined between the third latch location 1132 and the fourth latch location 1134. To form the bolt openings 1136, the latch component 1122 may protrude outwardly from the first side member 1010 to allow the bolt 1118 to fit and slide therebetween. The bolt 1118 is free to rotate and slide axially relative to the latch component 1122. In a different embodiment, the bolt 1118 may only rotate freely relative to the latch component 1122 but is otherwise fixed from sliding relative thereto.

The bolt 1118 may include a substantially straight end 1138 disposed furthest from the catch member 1102 and a bent end 1140 disposed nearest the catch member 1102. The bent end 1140 is located outside of a perimeter defined by the latch component 1122, and when in the closed position 1100, the bent end 1140 may rest against the catch member 1102 to lock the door 1014. When in the locked position (illustrated in FIGS. 10-11A) or when in the resting position (illustrated in the open position 1200 in FIG. 12), the bent end 1140 of the bolt 1118 may point outwardly from the first side member 1010.

The lever 1120 may be a single wire coupled to the bolt 1118. The lever 1120 may hang below the bold 1118 and form a U-shaped bend. The lever 1120 can have a first end 1142 and a second end 1144. The first end 1142 is coupled to the bolt 1118 nearest the bent end 1140, but inside the perimeter of the latch component 1122. The first end 1142 can be affixed to an inner facing portion of the bolt 1118. The lever 1120 is also coupled to the inner facing portion of the bolt 1118 at the second end 1144. The second end 1144 is coupled to the bolt 1118 within the perimeter of the latch component 1122.

The lever 1120 is affixed solely to the bolt 1118 so the lever 1120 is free to rotate about an axis defined by the bolt 1118. Pivoting the lever 1120 away from the first side member 1010 can cause the bolt 1118 to rotate. The bent end 1140 of the bolt 1118 latches the door 1014 when it couples to the U-shaped portion of the catch member 1102 while in the closed position 1100. By rotating the bolt 1118 so that the bent end 1140 uncouples from the catch member 1102, the door 1014 may be moved in a lateral direction 1206 so that the door 1014 may be disposed in its open position 1200.

By rotating the bolt 1118 so that the bent end 1140 faces upwards, the latch assembly 1016 can be positioned to move to or from the closed position 1100. The door 1014 can be moved in a lateral direction 1206 until the bent end 1140 is able to latch or couple to the catch member 1102. By pivoting the lever 1120 into the resting position below the bolt 1118, the bolt 1118 can be coupled to the catch member 1102 and the door 1014 may be latched in the closed position 1100.

The crate 1000 can also be collapsed into a collapsed position similar to that of FIG. 5. The crate 1000 can also include a tray or pan that can be removably positioned or coupled to the crate.

Figure 13:
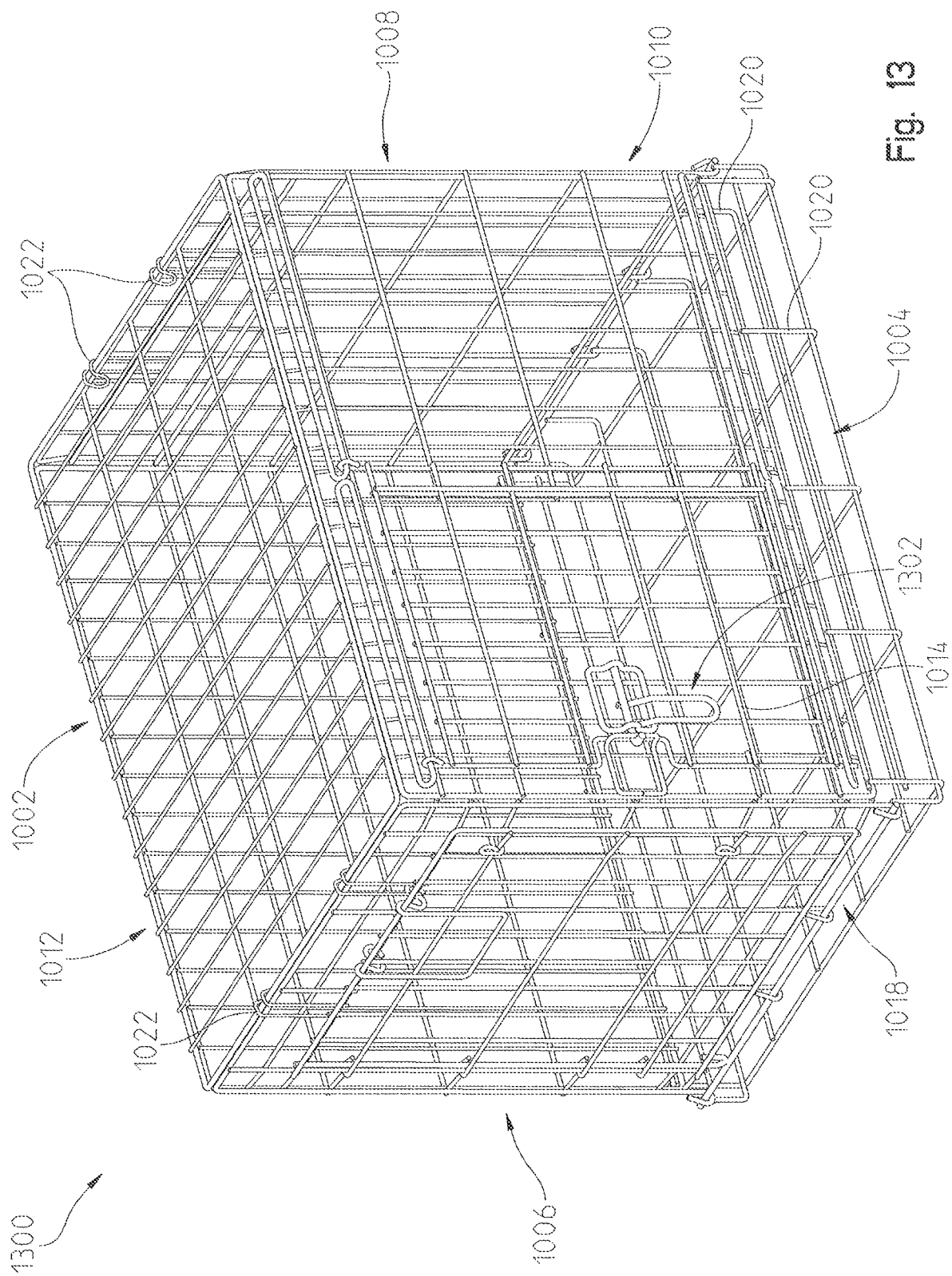
FIG. 13 is a perspective view of another embodiment of a wire animal crate.

Referring to FIG. 13, yet another embodiment of a collapsible crate 1300 is shown. The crate 1300 can be formed of substantially horizontal and vertical wires that overlap one another to define an interior portion. One or more of the horizontal wires can be coupled to one or more of the vertical wires, and vice versa, to add structural integrity to the crate 1300. For instance, the wires may be welded, adhered, fastened, or coupled to one another through a variety of means. The crate 1300 can include a top member 1002, a bottom member 1004, a front member 1006, and a back member 1008. The crate 1300 can further include a first side member 1010 and a second side member 1012, where the first side member 1010 is oppositely disposed from the second side member 1012. The dimensions of each member can vary to accommodate the size of any animal, for example. In an upright, fully assembled orientation or position, the top member 1002, bottom member 1004, front member 1006, back member 1008, first side member 1010, and second side member 1012 can define an interior of the crate 1300 which is sized to receive and accommodate an animal or other object, as desired.

In one aspect, the front member 1006, back member 1008, top member 1002, and bottom member 1004 can form a continuous structure. In other words, these members can be fixedly attached to one another. Alternatively, the top member 1002, bottom member 1004, first side member 1010, and second side member 1012 can form a continuous structure such that the top member 1002 and bottom member 1004 are affixed to the first side member 1010 and second side member 1012. In a different aspect, each member may be removably coupled to one another such that the different members are removably coupled to one another. In the illustrated example of FIG. 13, a plurality of clips 1022 can be used to fasten or couple the top member 1002 to the front member 1006 and the back member 1008. Similar clips or fasteners can be used to couple the other members of the crate 1300.

Each of the top member 1002, bottom member 1004, front member 1006, back member 1008, first side member 1010, and second side member 1012 can be formed by a plurality of overlapping horizontal and vertical wires or rods. The number of horizontal and vertical wires as well as the spacing therebetween can vary. If a smaller animal is being contained in the crate 1300, the spacing may be desirably smaller than if a larger animal is being contained.

In FIG. 13, the first side member 1010 of the crate 1300 can define a door frame which includes corresponding structure for accommodating a door 1014. The door 1014 can also be made of substantially overlapping horizontal and vertical wires as shown in FIG. 13. Further, the door 1014 can be movably disposed between an open position 1500 and a closed position 1400. In the open position 1500, i.e., in FIG. 15, the first side member 1010 defines an opening 1202 that provides access to the interior of the crate 1300.

The crate 1300 can further include a latch assembly 1302 pivotably coupled to the door 1014 to be releasably coupled to the first side member 1010 to maintain or latch the door 1014 in a closed position 1400. The first side member 1010 can form a portion of a door frame for the door 1014, and as shown in FIG. 13 can be formed by a plurality of horizontally and vertically disposed wires.

The front member 1006 can be offset or spaced from the bottom member 1004 to define a slot or opening 1018 therebetween. In this manner, a pan (not shown), tray, pet bed, blanket or other apparatus can be slidably positioned above the bottom member 1004 in the opening 1018. In this manner, an animal being contained within the crate 1300 can rest on a more comfortable pet bed, comforter, tray, pan, etc. In the embodiment of FIG. 13, the first side member 1010, the second side member 1012, and/or the bottom member 1004 can include support wires 1020 disposed in connection with the bottom member 1004 to prevent the pet bed (not shown) from shifting laterally from the confined space. The back member 1008 can also include similar support wires 1020 to further position the pet bed, tray, pan, etc. within the defined opening 1018. In this configuration, the pan, bed, tray, etc. may only be positioned within the defined opening 1018 in the front member 1006. Although not shown, the crate 1300 can further include a latch or other mechanism to prevent the bed, pan, tray, etc. from sliding or moving out of position via the opening 1018 (i.e., due to movement of the animal inside the crate).

Figure 14A:
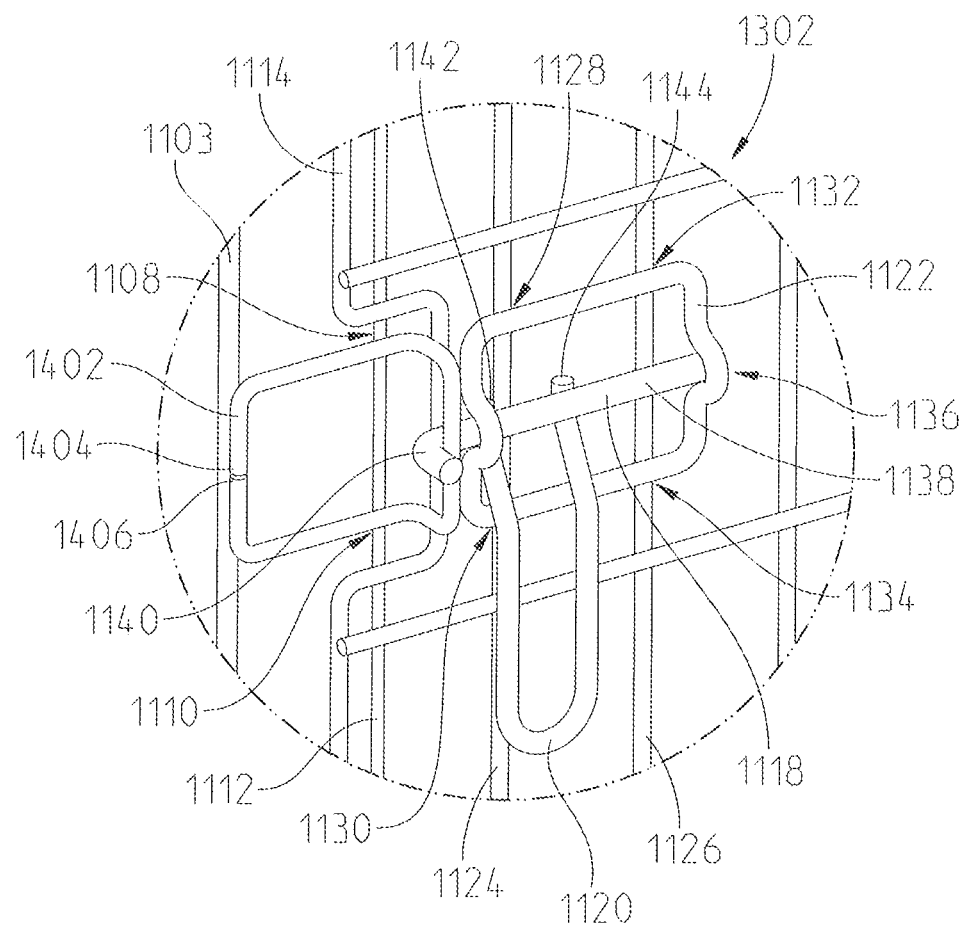
FIG. 14A is a partial enlarged perspective view of the door frame and door of FIG. 13.

In FIGS. 14 and 14A, the first side member 1010 and door 1014 are shown in greater detail. The first side member 1010 can form a door frame for the door 1014 such that the door 1014 is slidably coupled thereto. A substantially rectangular catch member 1402 can be coupled to the first side member 1010. Alternative designs for the catch member 1402 are contemplated herein including designs that are substantially square, circular, oval, triangular, etc. The catch member 1402 may be formed by a single wire having a first end 1404 and a second end 1406 that can come together as shown in FIG. 14A. Both ends 1404, 1406 can define a portion of the catch member 1402 that couples with the outer wire 1103. In one aspect, the catch member 1402 can be formed by a single wire with the first end 1404 integrally formed with the second end 1406. In this aspect, the catch member 1402 forms a closed-ended design. Alternatively, the first end 1404 can be spaced from the second end 1406, but the spacing between the two ends is less than the spacing between the first end 1104 and second end 1106 of the catch member 1102 in FIG. 11A. The catch member 1402 is coupled to the first side member 1010 via an outer wire 1103. A fixed vertical wire 1112 can be disposed adjacent to and parallel with the outer wire 1103 of the first side member 1010, and the wire 1112 may define one edge of the door frame. The catch member 1402 can also be coupled to the fixed vertical wire 1112 at a first location 1108 and a second location 1110 for stability. The catch member 1402 may be bent to protrude outwardly from the first side member 1010 as shown in FIG. 14A.

The sliding mechanism for the door 1014 of crate 1300 is substantially similar to the sliding mechanism of the previously described embodiment shown in FIGS. 6-9. The first guide member 718, second guide member 720, third guide member 722, and fourth guide member 724 are coupled to the first side member 1010 and guide the lateral movement of the door 1014 as it opens and closes. As shown in FIG. 14, the first guide member 718 and the second guide member 720 are formed as substantially oval or looped shaped structures. The first guide member 718 can define a first guide opening 726 and the second guide member 720 can define a second guide opening 728. Although not shown, the third guide member 722 and fourth guide member 724 can also form similar defined guide openings therein. These oval-shaped structures, however, are only shown as illustrative examples. The guide members can be bent, curved, or otherwise formed to provide guide wires, tracks, channels, openings, etc.

Each guide opening has a first end and a second end defined by the respective guide member. For example, the first guide member 718 has an end 730 that defines one end of the guide opening 726. Likewise, the second guide member 720 has an end 732 that defines one end of the guide opening 728. The respective ends 730, 732 can abut one another such that both guide members 718, 720 are in contact with one another or are spaced from one another such that a gap exists between each respective end 730, 732. In this manner, the length of travel of the door 1014 can be defined by the distance between the respective ends of the guide openings (i.e., the travel distance along the first guide member 718 is defined between ends 908 and 730, and the travel distance along the second guide member 720 is defined between ends 910 and 732).

As also shown in the illustrative embodiments of FIGS. 13-15, the first guide member 718, the second guide member 720, the third guide member 722, and the fourth guide member 724 can each be formed by a single wire. As such, each wire can be bent, curled, or otherwise formed to define how the door 1014 moves laterally with respect to the first side member 1010.

Further, the functionality and features of the second vertical wire 708 of the crate 600 may be incorporated in the illustrated crate 1300 of FIG. 13. The curled end 710 of the second vertical wire 708 slidably couples with the second guide wire 720 in the guide opening 728. The straight end 712 fits into the guide opening of the fourth guide member 724 simultaneously. Similarly, a first vertical wire 1114 has a curled end 714 that fits in the guide opening 726 and slidably couples with the first guide member 718. Additionally, the straight end 716 of the first vertical wire 1114 fits into the guide opening and slidably couples with the third guide member 722.

The first vertical wire 1114 differs from the first vertical wire 706 of previous embodiments (shown in FIGS. 6-9) in that it contains a U-shaped bend 1116 between the curled end 714 and the straight end 716. The U-shaped bend 1116 of the first vertical wire 1114 can mirror the contour of the bend formed by the substantially rectangular design of the catch member 1402 such that the catch member 1402 and the first vertical wire 1114 lie partially on the same plane, but do not interfere with one another. When the door 1014 is in the closed position 1400, the first vertical wire 1114 and the catch member 1402 can contact each other without interfering with the functionality of the latch 1302 due to the outward bend defined in the catch member 1402.

As shown in FIG. 14, the first end 714 of the first vertical wire 1114 forms a loop or curled end such that the first end 714 is coupled to the first guide member 718. Likewise, the first end 710 of the second vertical wire 708 forms a loop or curled end that is coupled to the second guide wire 720. The first ends of both vertical wires can slide relative to the first guide member 718 and second guide member 720 to allow the door 1014 to move between the closed position 1400, an open position 1500, and any position therebetween.

The first vertical wire 1114 can have a length such that the second end 716 thereof protrudes through the defined opening of the third guide member 722. Similarly, the second vertical wire 708 can have a length such that the second end 712 can protrude through the defined opening of the fourth guide member 724. In this configuration, an animal cannot push the door 1014 outward due to the interference created by the second ends of both vertical wires being at least partially captured in the defined openings of both guide members.

While the guide members are shown as forming loop or oval like structures, this is only illustrated as one example. In other examples, the first and second guide members can be single wires along which the first ends of both vertical wires slide. The third and fourth guide members may also be a single wire that is disposed outwardly from the first side member 1010 such that the second ends of both vertical wires is disposed between respective guide wire and the first side member 1010. Other tracks, channels, guides, etc. can be used to facilitate substantially linear movement of the door 1014 relative to the first side member 1010.

FIG. 14A demonstrates the latch assembly 1302 when it is in the closed position 1400. The latch assembly 1302 may include three components: a bolt 1118, a lever 1120, and a latch component 1122. The latch component 1122 is the base of the latch assembly 1302 and can include a wire bent into a substantially rectangular shape. The latch component 1122, however, may be any shape including oval, square, circular, trapezoidal, polygonal, or other known design. A first latch wire 1124 of the door 1014 is disposed adjacent to and spaced from the first vertical wire 1114. The latch component 1122 can be coupled to the first latch wire 1124 at a first latch location 1128 and a second latch location 1130. A second latch wire 1126 can be adjacent to and spaced from the first latch wire 1124. The latch component 1122 can also be attached to the second latch wire 1126 at a third latch location 1132 and a fourth latch location 1134. Depending on the spacing between the vertical wires of the door 1014, the latch component 1122 can be coupled at more than just four locations. In one aspect, the first and third latch locations 1128, 1132 may be aligned with the first location 1108 of the catch member 1402. Additionally, the second and fourth latch locations 1130, 1134 may be aligned with the second location 1110 of the catch member 1402.

In one aspect, substantially straight portions of the latch component 1122 may lie between the first latch location 1128 and the third latch location 1132 and also between the second latch location 1130 and the fourth latch location 1134. To accommodate the bolt 1118, the latch component may define two bolt openings 1136. The bolt openings 1136 can include a first bolt opening defined between the first latch location 1128 and the second latch location 1130, and a second bolt opening defined between the third latch location 1132 and the fourth latch location 1134. To form the bolt openings 1136, the latch component 1122 may protrude outwardly from the first side member 1010 to allow the bolt 1118 to fit and slide therebetween. The bolt 1118 is free to rotate and slide axially relative to the latch component 1122. In a different embodiment, the bolt 1118 may only rotate freely relative to the latch component 1122 but is otherwise fixed from sliding relative thereto.

The bolt 1118 may include a substantially straight end 1138 disposed furthest from the catch member 1402 and a bent end 1140 disposed nearest the catch member 1402. The bent end 1140 is located outside of a perimeter defined by the latch component 1122, and when in the closed position 1400, the bent end 1140 may rest against the catch member 1402 to lock the door 1014. When in the locked position (illustrated in FIGS. 13-14A) or when in the resting position (illustrated in the open position 1500 in FIG. 15), the bent end 1140 of the bolt 1118 may point outwardly from the first side member 1010.

The lever 1120 may be a single wire coupled to the bolt 1118. The lever 1120 may hang below the bold 1118 and form a U-shaped bend. The lever 1120 can have a first end 1142 and a second end 1144. The first end 1142 is coupled to the bolt 1118 nearest the bent end 1140, but inside the perimeter of the latch component 1122. The first end 1142 can be affixed to an inner facing portion of the bolt 1118. The lever 1120 is also coupled to the inner facing portion of the bolt 1118 at the second end 1144. The second end 1144 is coupled to the bolt 1118 within the perimeter of the latch component 1122.

The lever 1120 is affixed solely to the bolt 1118 so the lever 1120 is free to rotate about an axis defined by the bolt 1118. Pivoting the lever 1120 away from the first side member 1010 can cause the bolt 1118 to rotate. The bent end 1140 of the bolt 1118 latches the door 1014 when it couples to the catch member 1402 while in the closed position 1400. By rotating the bolt 1118 so that the bent end 1140 uncouples from the catch member 1402, the door 1014 may be moved in a lateral direction 1206 so that the door 1014 may be disposed in its open position 1500.

By rotating the bolt 1118 so that the bent end 1140 faces upwards, the latch assembly 1302 can be positioned to move to or from the closed position 1400. The door 1014 can be moved in a lateral direction 1206 until the bent end 1140 is able to latch or couple to the catch member 1402. By pivoting the lever 1120 into the resting position below the bolt 1118, the bolt 1118 can be coupled to the catch member 1402 and the door 1014 may be latched in the closed position 1400.

The crate 1300 can also be collapsed into a collapsed position similar to that of FIG. 5. The crate 1300 can also include a tray or pan that can be removably positioned or coupled to the crate.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:
1. An animal crate, comprising:
a door frame having a plurality of interconnected horizontal and vertical wires that define an opening for an animal to pass therethrough and enter or exit an interior of the animal crate;
a door configured to move laterally between an open position and a closed position relative to the door frame, the door having a plurality of interconnected horizontal and vertical wires, wherein the door remains in a plane when moving laterally between the open position and the closed position; and
at least two mechanisms releasably coupling the door to the door frame in the closed position, wherein the first of the two mechanisms is configured to move inwardly toward the interior of the animal crate relative to the door and the second of the two mechanisms is affixed to the door frame;
wherein, the first of the two mechanisms is releasably coupled to the second of the two mechanisms when the door is in the closed position; and
wherein, the first of the two mechanisms is movable inwardly upon being pressed toward the interior of the animal crate relative to the door as the door is simultaneously moved laterally such that the first of the two mechanisms is movable past the second of the two mechanisms as the door is moved between the open and closed positions.

2. The animal crate of claim 1, wherein the first of the two mechanisms comprises a latch member formed by a single wire that is bent in a plurality of locations.

3. The animal crate of claim 2, wherein the latch member is coupled to a vertical wire of the door at a first location and a second location.

4. The animal crate of claim 3, wherein the first of the two mechanisms further comprises a contact member that includes a planar portion and is coupled to an upper portion and a lower portion of the latch.

5. An animal crate, comprising:
a door frame having a plurality of interconnected horizontal and vertical wires that define an opening for an animal to pass therethrough and enter or exit an interior of the animal crate;
a door configured to move laterally between an open position and a closed position relative to the door frame, the door having a plurality of interconnected horizontal and vertical wires; and
at least two mechanisms releasably coupling the door to the door frame in the closed position, wherein the first of the two mechanisms is configured to move inwardly toward the interior of the animal crate relative to the door and the second of the two mechanisms is affixed to the door frame;
wherein, the first of the two mechanisms is releasably coupled to the second of the two mechanisms when the door is in the closed position; and wherein, the first of the two mechanisms is movable inwardly toward the interior of the animal crate relative to the door as the door is moved laterally such that the first of the two mechanisms is movable past the second of the two mechanisms as the door is moved between the open and closed positions;

wherein the second of the two mechanisms comprises a side stop member; and wherein a portion of the latch member is spaced apart from a vertical wire of the door to form a gap therebetween; and wherein the side stop member is positioned in the gap when the door is in the closed position.

6. The animal crate of claim 5, wherein the side stop member is formed by a single u-shaped wire.

7. The animal crate of claim 5, wherein the door frame includes a first stop mechanism;

and the vertical wire of the door contacts the first stop mechanism when the door is in the open position.

8. The animal crate of claim 7, wherein the first stop mechanism is a u-shaped wire extending outwardly away from the interior of the animal crate.

9. The animal crate of claim 7, further comprising a first guide wire coupled to the door frame;

wherein, the vertical wire of the door is coupled to and moves along the first guide wire as the door moves between the open and closed positions.

10. The animal crate of claim 5, wherein the door frame includes a first stop mechanism;

wherein, the vertical wire of the door that forms the gap is a first vertical wire disposed at a first end of the door;

wherein, the door includes a second vertical wire disposed at a second end of the door opposite the first end; and wherein, the second vertical wire contacts the first stop mechanism when the door is in the closed position.

11. The animal crate of claim 10, further comprising a first guide wire and a second guide wire coupled to the door frame;

wherein, the first vertical wire is coupled to and moves along the first guide wire as the door moves between the open and closed positions, and the second vertical wire is coupled to and moves along the second guide wire as the door moves between the open and closed positions.

12. An animal crate, comprising:

a door frame having a plurality of interconnected horizontal and vertical wires that define an opening for an animal to pass therethrough and enter or exit an interior of the animal crate;

a door configured to move laterally between an open position and a closed position relative to the door frame and relative to a first stop mechanism of the animal crate, the door having a plurality of interconnected horizontal and vertical wires;

a first vertical wire and a second vertical wire of the door, the first vertical wire and the second vertical wire being spaced from one another such that the first vertical wire is at a first end of the door and the second vertical wire is at a second end of the door;

wherein, the first vertical wire of the door is coupled to and moves along a first guide wire as the door moves between the open and closed positions; and wherein the first vertical wire of the door contacts the first stop mechanism when the door is in the open position.

13. The animal crate of claim 12, further comprising:

at least two mechanisms releasably coupling the door to the door frame in the closed position, wherein the first of the two mechanisms is configured to move inwardly toward the interior of the animal crate relative to the door and the second of the two mechanisms is affixed to the door frame;

wherein, the first of the two mechanisms is releasably coupled to the second of the two mechanisms when the door is in the closed position; and wherein, the first of the two mechanisms is movable inwardly toward the interior of the animal crate relative to the door as the door is moved laterally such that the first of the two mechanisms is movable past the second of the two mechanisms as the door is moved between the open and closed positions.

14. The animal crate of claim 12, wherein the second vertical wire of the door is coupled to and moves along the first guide wire as the door moves between the open and closed positions.

15. The animal crate of claim 14, wherein the second vertical wire of the door contacts the first stop mechanism when the door is in the closed position.

16. The animal crate of claim 12, wherein the first vertical wire of the door comprises a curled first end coupled to the first guide wire;

wherein, the curled first end contacts the first stop mechanism when the door is the open position.

17. The animal crate of claim 12, further comprising a second stop mechanism;

wherein, the first and second stop mechanisms are included in a single vertical wire of the door frame.

18. The animal crate of claim 12, further comprising a second guide wire coupled to the door frame;

wherein, the second vertical wire of the door is coupled to and moves along the second guide wire as the door moves between the open and closed positions.

19. The animal crate of claim 18, further comprising a second stop mechanism;

wherein, the first stop mechanism comprises an end of the first guide wire, and the second stop mechanism comprises an end of the second guide wire, which is positioned adjacent the first stop mechanism.

20. The animal crate of claim 19, wherein the second vertical wire of the door contacts the second stop mechanism when the door is in the closed position.

* * * * *